United States Patent
Bastyr et al.

(10) Patent No.: US 10,065,561 B1
(45) Date of Patent: Sep. 4, 2018

(54) SYSTEM AND METHOD FOR VEHICLE NOISE MASKING

(71) Applicant: Harman International Industries, Incorporated, Stamford, CT (US)

(72) Inventors: Kevin J. Bastyr, Franklin, MI (US); Antonio Gomez, Hazel Park, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/873,792

(22) Filed: Jan. 17, 2018

(51) Int. Cl.
- *H04B 1/00* (2006.01)
- *B60Q 5/00* (2006.01)
- *B60W 40/105* (2012.01)
- *G10K 15/02* (2006.01)

(52) U.S. Cl.
CPC ........... *B60Q 5/008* (2013.01); *B60W 40/105* (2013.01); *G10K 15/02* (2013.01); *B60W 2520/105* (2013.01)

(58) Field of Classification Search
None
See application file for complete search history.

(56) References Cited

U.S. PATENT DOCUMENTS

| | | | |
|---|---|---|---|
| 4,220,927 A * | 9/1980 | Austin | H03K 4/06 327/140 |
| 4,395,734 A * | 7/1983 | Rypkema | H04N 7/10 348/734 |
| 5,237,617 A | 8/1993 | Miller | |
| 5,517,173 A | 5/1996 | Cha et al. | |
| 5,635,903 A | 6/1997 | Koike et al. | |
| 5,835,605 A | 11/1998 | Kunimoto | |
| 7,203,321 B1 | 4/2007 | Freymann et al. | |
| 8,594,341 B2 * | 11/2013 | Rothschild | H04H 60/04 381/123 |
| 8,649,923 B2 | 2/2014 | Sankaran et al. | |
| 8,885,845 B2 | 11/2014 | Honji et al. | |
| 8,907,604 B2 | 12/2014 | Miller et al. | |
| 9,769,561 B1 * | 9/2017 | Clark | H04R 1/30 |
| 2005/0169484 A1 | 8/2005 | Cascone et al. | |
| 2007/0025703 A1 * | 2/2007 | Horie | G11B 27/105 386/230 |

(Continued)

FOREIGN PATENT DOCUMENTS

WO 2012016722 A2 2/2012

*Primary Examiner* — Peter Vincent Agustin
(74) *Attorney, Agent, or Firm* — McCoy Russell LLP

(57) ABSTRACT

Embodiments are disclosed for generating masking sounds in a vehicle, such as an at least partially electric vehicle. An example sound generation system in a vehicle includes a speaker, a processor, and a storage device holding instructions executable by the processor to modulate a sound characteristic of a first frequency range of a synthetic sound to generate a modulated synthetic sound portion while maintaining the sound characteristic of a second frequency range of the synthetic sound that is lower than the first frequency range to generate an unmodulated synthetic sound portion. The instructions are further executable to output a combined synthetic sound including both the modulated synthetic sound portion and the unmodulated synthetic sound portion. The sound characteristic of the first frequency range may be modulated as a function of a vehicle operating parameter.

20 Claims, 13 Drawing Sheets

(56) References Cited

U.S. PATENT DOCUMENTS

| | | | |
|---|---|---|---|
| 2007/0049227 A1* | 3/2007 | Su | H03G 3/345 |
| | | | 455/223 |
| 2010/0089307 A1 | 4/2010 | Kenchington | |
| 2014/0085071 A1* | 3/2014 | Tsuzuki | G10K 15/02 |
| | | | 340/466 |
| 2014/0177866 A1 | 6/2014 | Peachey et al. | |
| 2016/0249145 A1* | 8/2016 | Ohl | H04R 25/558 |

\* cited by examiner

SYSTEM AND METHOD FOR VEHICLE NOISE MASKING

FIELD

The disclosure relates to masking sounds from vehicles, such as electronic vehicles that do not include internal combustion engines, by augmenting synthetic sounds.

BACKGROUND

The natural sound of electric vehicles is different from the natural sound of vehicles with internal combustion engines. While drivers may be accustomed to hearing cues regarding vehicle operation from an internal combustion engine (e.g., low frequency rumble and increased sound levels and pitch as vehicle or engine speed increases), an electric motor has a relatively quiet, low frequency whine under most conditions. However, a driver may be able to perceive other noises of an electric vehicle that are not perceptible during normal operation of an internal combustion engine-driven vehicle. For example, sound emitted from the tires, suspension, general vehicle noise, vibration, harshness (NVH), and even some noise from the electric motor (e.g., motor whine) of an electric vehicle are apparent during most driving conditions.

SUMMARY

An electric vehicle sound signature may be a combination of mostly unpleasant noises, including electric motor whine, which has a relatively few harmonics. One approach to masking these noises includes playing sounds via one or more speakers in a cabin of the vehicle. However, if relatively static sounds are played back via the speakers, these sounds provide no feedback regarding vehicle operation (e.g., in comparison to an internal combustion engine, whose sound character changes with different vehicle speeds and/or responsive to different acceleration requests). Accordingly, another approach to masking these noises may include pitch shifting played-back audio to simulate increases and decreases in vehicle speed. However, this approach may reduce the masking capabilities of the output sound, as all frequencies are shifted with changing vehicle speeds (or other operating parameters). For example, the sound signature of an electric vehicle (e.g., tire noise, NVH, electric motor whine, etc.) may be masked by simulated sound output at frequencies below a threshold. As the simulated vehicle sound is pitch shifted upward, however, the simulated sound may no longer mask the unpleasant natural electric vehicle noises.

Embodiments are disclosed for generating synthetic sound that simulates the changing vehicle operating parameters while still masking vehicle noise (e.g., primarily at low frequencies). An example sound generation system in a vehicle includes a speaker, a processor, and a storage device holding instructions executable by the processor to modulate a sound characteristic of a first frequency range of a synthetic sound to generate a modulated synthetic sound portion while maintaining the sound characteristic of a second frequency range of the synthetic sound that is lower than the first frequency range to generate an unmodulated synthetic sound portion, and output, via the speaker, a combined synthetic sound including both the modulated synthetic sound portion at the first frequency range and the unmodulated synthetic sound portion at the second frequency range. In a first example, the sound characteristic is a corner frequency of a low pass filter. In a second example, the sound characteristic is a center frequency of a peak filter. In a third example, the modulated synthetic sound portion includes one or more first synthetic sound signals each modulated based on the first vehicle operating parameter, and the unmodulated synthetic sound portion includes a selected sound signal of the one or more first synthetic sound signals that remains unmodulated independent of the first vehicle operating parameter. In the third example, the sound characteristic is a playback rate or pitch of the one or more first synthetic sound signals. The instructions may be further executable to generate (or process then replay) a synthetic sound signal representing the synthetic sound, receive sensed data from a first vehicle sensor, and determine a first vehicle operating parameter using the sensed data from the first vehicle sensor.

An example method of generating synthetic sound in a vehicle includes generating a synthetic sound signal representing a synthetic sound for masking vehicle noises, receiving sensed data from a first vehicle sensor, determining a first vehicle operating parameter using the sensed data from the first vehicle sensor, modulating a corner frequency of a low-pass filter as a function of the first vehicle operating parameter and filtering the synthetic sound signal with the low-pass filter to generate a combined synthetic sound signal representing a combined synthetic sound having a modulated synthetic sound portion in a first frequency range while maintaining an unmodulated synthetic sound portion in a second frequency range that is lower than the first frequency range. For example, the method may include filtering a broadband sound with a low-pass filter, generating a new sound with a modulated first portion and an unmodulated second portion, the first portion being higher in frequency than the second portion. The example method further includes outputting the combined synthetic sound including both the modulated synthetic sound portion at the first frequency range and the unmodulated synthetic sound portion at the second frequency range.

An example sound generation system in a vehicle includes a speaker, a processor, and a storage device holding instructions executable by the processor to generate a synthetic sound signal representing a synthetic sound for masking vehicle noises, receive sensed data from a first vehicle sensor, and determine a first vehicle operating parameter using the sensed data from the first vehicle sensor. The instructions are further executable to modulate a center frequency of a peak filter as a function of the first vehicle operating parameter, filtering the synthetic sound signal with the peak filter to generate a combined synthetic sound signal representing a combined synthetic sound having a modulated synthetic sound portion in a first frequency range while maintaining an unmodulated synthetic sound portion in a second frequency range that is lower than the first frequency range, and output, via the speaker, the combined synthetic sound including both the modulated synthetic sound portion at the first frequency range and the unmodulated synthetic sound portion at the second frequency range.

BRIEF DESCRIPTION OF THE DRAWINGS

The disclosure may be better understood from reading the following description of non-limiting embodiments, with reference to the attached drawings, wherein below.

DETAILED DESCRIPTION

As discussed above, electric vehicle sounds may include unpleasant noises, such as electric motor whine and vehicle noise, vibration, harshness (NVH) characteristics. The disclosure provides approaches for masking the unpleasant noises, while simultaneously providing feedback regarding vehicle operation changes (e.g., changes in vehicle speed or acceleration requests), simulating similar sounds that are experienced in internal combustion engine-driven vehicles. The disclosure also provides approaches for masking unpleasant noises with completely new sounds that replace those heard in typical vehicles.

Figure 1:
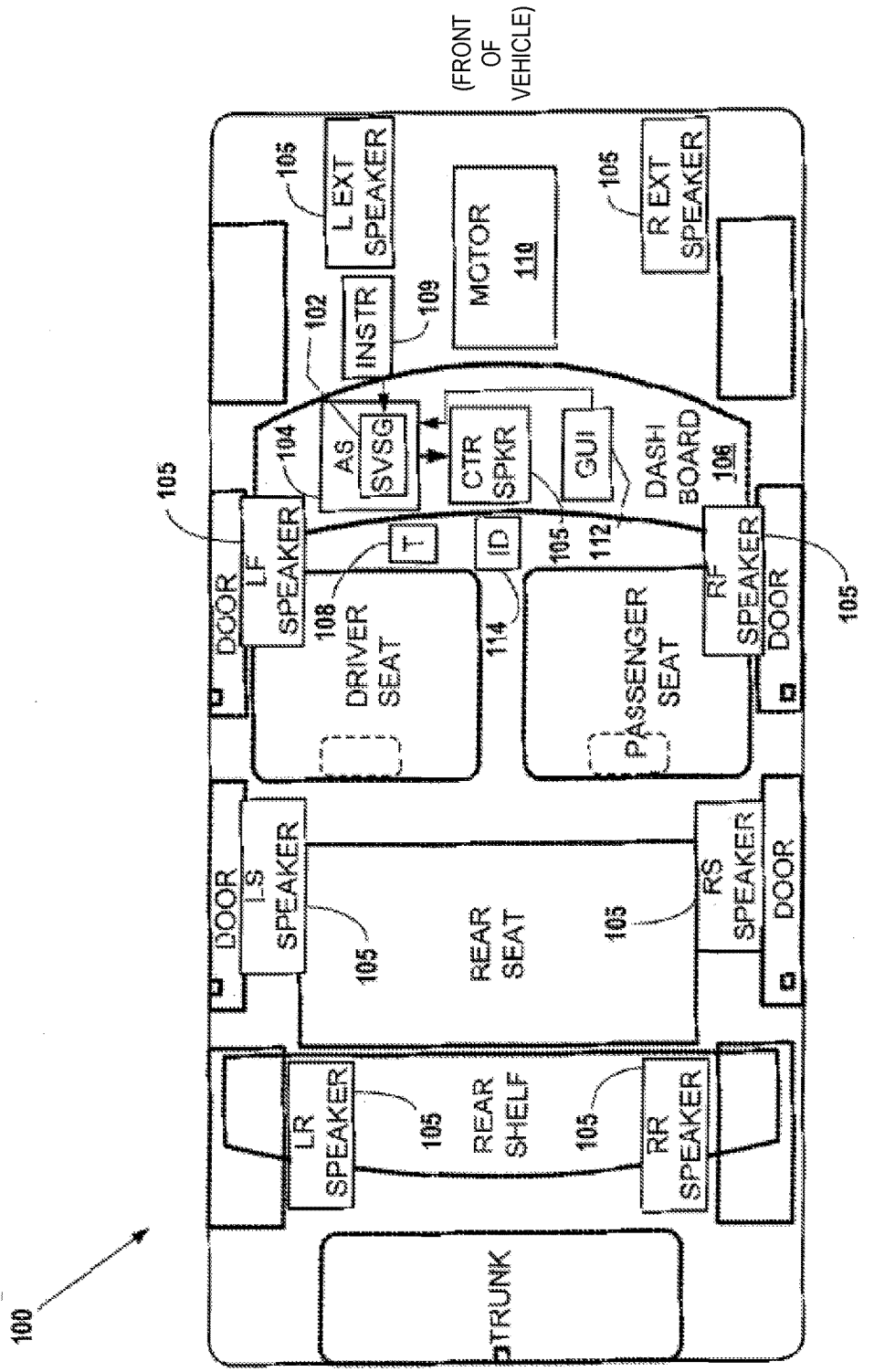
FIG. 1 shows an example vehicle including a simulated vehicle sound generator system in accordance with one or more embodiments of the present disclosure.

FIG. 1 shows a vehicle 100 that includes a simulated vehicle sound generator (SVSG) system 102. The vehicle may include an audio system (AS) 104, shown in FIG. 1 as being optionally located in a dash board 106 of the vehicle 100. The audio system 104 may include various components associated with a vehicle audio system, such as AM/FM/XM/shortwave radio, CD player, cassette deck, personal music player input connector (e.g., auxiliary cable input, universal serial bus input, etc.), equalizer, amplifier, cellular telephone interface, navigation system, and/or any other components associated with a vehicle audio system. The audio system 104 may be a two channel stereo or multi-channel (such as four, five, eight, or twelve channel) surround system. The audio system 104 may include software modules, hardware modules, or a combination thereof used to process audio signals provided to a plurality of speakers 105 throughout the vehicle 100. The audio system 104 may include a processor and memory adapted to support, control, interface with, and/or be controlled by the SVSG system 102, as described in more detail below. Alternatively, the SVSG system 102 may have a dedicated local processor.

In one example, the vehicle 100 may be a fully or partially-electric vehicle, a hydrogen fuel cell vehicle, or any vehicle where the engine provides insufficient masking of undesirable sounds, and driven by or with the assistance of an electric motor 110. In additional or alternative examples, the vehicle 100 may include an internal combustion engine. The motor 110 of the vehicle may generate sounds that are different than those that may be heard by vehicle occupants in other vehicle types, such as a vehicle having an internal combustion engine (or only an internal combustion engine). Occupants of an electric vehicle may desire to experience sounds associated with an internal combustion engine or other sound effects (e.g., other simulated engine sounds with any type of character). Furthermore, the occupants may desire to experience sounds that mask any one or more of the NVH (noise, vibration, harshness) sounds of the vehicle/electric motor and/or environmental noises (e.g., noises from neighboring vehicles, wind noise, road noise, noise from other occupants of the vehicle, etc.) that would otherwise typically be masked by a continuously-running internal combustion engine. The SVSG system 102 may be configured to simulate sounds associated with a vehicle being driven by a combustion engine, such as a jet, motorboat, rocket, or other vehicle type. The SVSG system 102 may additionally or alternatively be configured to simulate other sounds as well, such as sounds having sound characteristics adapted to mask the above-described NVH or other vehicle and/or environmental noises. In one example, the SVSG system 102 may generate simulated engine sounds or other sounds based on one or more operating conditions of the vehicle 100, such as road/vehicle speed, torque, pedal position, throttle position, drivetrain status/mode, transmission type (e.g., automatic versus manual), transmission gear changes, vehicle position, etc. For example, the SVSG system 102 may be configured to generate simulated sounds associated with a multi-gear vehicle having an internal combustion engine. In examples where the vehicle 100 includes an internal combustion engine (e.g., in the case of a hybrid vehicle that includes an internal combustion engine and an electric motor), the SVSG system 102 may be configured to generate simulated sounds to augment the sounds of the internal combustion engine, thereby causing the sound of the internal combustion engine experienced by a listener to be enhanced by the simulated sounds.

The sounds discussed herein may be produced through one or more of the speakers 105 present throughout the vehicle 100. The speakers 105 may include cabin speakers such as a center (CTR) speaker, right front (RF) and left front (LF) speakers, right side (RS) and left side (LS) speakers, and right rear (RR) and left rear (LR) speakers as shown in FIG. 1. The cabin speakers may be driven to produce sounds optimized for occupants of the vehicle (e.g., toward an interior of the vehicle). In one example, the vehicle 100 may also include a right external (R EXT) and a left external (L EXT) speaker positioned in the motor compartment of the vehicle 100 or otherwise positioned to direct sound out of the vehicle. Each of the speakers 105 may be driven to produce sound waves based on audio signals generated by the SVSG system 102. The right and left external speakers may be driven to produce simulated vehicle sounds that are audible outside/external to the vehicle 100 and to occupants inside of the vehicle 100. For example, the external speakers may mask the suspension and other noises of the vehicle for external listeners and/or provide a high quality sonic impression. The sound output by the external speakers may also function as a pedestrian alerting system. In some examples, each individual speaker 105 may be driven individually (e.g., with different audio signals from one another), while in other examples, all speakers designated to provide a simulated sound may be driven with the same audio signal as one another. In still other examples, some individual speakers may be driven individually, while other speakers are driven with the same audio signal as one another.

The SVSG system 102 may generate sounds based on various operating conditions of the vehicle 100. For example, the SVSG system 102 may receive an input signal based on a throttle (T) 108 of the vehicle 100 and/or a vehicle speed or a road speed of the vehicle 100 (e.g., a velocity of the vehicle while the vehicle is travelling on a road, off-road, or on some other surface, where the velocity is zero when the vehicle is not moving). In other examples, the SVSG system 102 may receive an input signal based on other data, such as a GPS-derived speed, engine torque, change in shaft RPM, change in wheel RPM, wheel hub RPM, etc.

A position level of the throttle 108 (e.g., a pedal position) may be provided directly to the SVSG system 102 as shown in FIG. 1 or may be indirectly obtained by the SVSG system 102 through a controlled area network (CAN) (not shown) or other suitable in-vehicle communication bus system (e.g., Media Oriented Systems Transport [MOST], Audio-Video Bridging [AVB], Peripheral Sensor Interface for Automotive Applications [PSI5], etc.). The vehicle speed of the vehicle 100 may be determined at an instrumentation module 109 that may generate a vehicle speed signal indicative of the vehicle speed of the vehicle 100. The SVSG system 102 may receive the throttle level of the throttle 108 and/or a pedal position (e.g., indicating the throttle level) and the vehicle speed signal. The SVSG system 102 may generate simulated engine sounds based on the throttle level (e.g., the pedal position) and/or the vehicle speed signal, as will be described in more detail below. In other examples, one or more other input signals may be utilized in addition to or in lieu of the throttle position and the vehicle speed, such as motor load, torque, power, vehicle light status, vehicle position (e.g., based on a global positioning system signal), drivetrain operation, transmission mode, change in RPM of various shafts, recorded environmental, cabin, and/or vehicle noise level/characteristics, user input, number of occupants (e.g., based on seat pressure sensors and/or other vehicle occupancy detectors such as seatbelt sensors), cruise control operation, and/or other dynamic status inputs.

The vehicle 100 may also include an input device (ID) 114. The input device 114 may include a manual gear shifter that is operable by a vehicle occupant to manually provide input to the SVSG system 102 indicating when a simulated upshift or downshift is desired. The input device 113 may be used in conjunction with automatic simulated multi-gear functions, causing the SVSG system 102 to operate in a semi-automatic manner. In one example, the input device 114 may be a lever mounted in a steering column of the vehicle 100, dash board 106, and/or in another suitable area within the vehicle 100. In other examples, the input device 114 may include multiple levers, or other mechanisms configured to receive manual input, disposed within the vehicle 100, such as separate dedicated upshift or downshift levers. Levers or other input devices may be multi-positional, enabling a particular simulated gear to have a specific position (e.g., where the different positions of the input devices are each mapped to an associated simulated gear in a look-up table or other storage mechanism accessible by the SVSG system 102). In other examples, the levers may be of a "flappy paddles" configuration, enabling the levers to be biased from an initial position for simulated downshifting/upshifting and returning to the initial position for subsequent simulated shifting.

The SVSG system 102 may be implemented within the audio system 104 as shown in FIG. 1 or may be implemented as a stand-alone system separate from the audio system 104. The SVSG system 102 may produce audible sound through one or more of the speakers 105. All, some, or one of the speakers 105 may be shared by both the SVSG system 102 and the audio system 104 in some examples (e.g., where audio signals from each of the SVSG system 102 and the audio system 104 drive the shared speaker(s) 105). In such examples, shared speakers may mitigate conflicting instructions (e.g., instructions from both the SVSG system 102 and the audio system 104) by defaulting to the SVSG system 102, by making an on-the-fly negotiation using current operating parameters, or by mixing the audio signals from each of the SVSG system 102 and the audio system 104 to output a combined sound signal. In other examples, one, some, or each of the speakers 105 may be dedicated to only one of the SVSG system 102 or the audio system 104 (e.g., only outputting sound based on instructions from the associated one of the SVSG system 102 or the audio system 104). In some examples, an external amplifier (not shown) may optionally mix signals from SVSG system 102 and audio system 104 to play the combined signal through some or all of the speakers 105.

The SVSG system 102 may select a subset of available speakers 105 to generate selected simulated engine sound based on input from a current vehicle occupant or based on predetermined criteria, in some examples. For example, a first driver of the vehicle 100 may select the left and right external speakers and the center speakers to be used to produce sounds from the SVSG system 102. A second subsequent driver of the vehicle 100 may select only the center speaker to be used to produce sounds from the SVSG system 102. The SVSG system 102 may include and/or be in communication with a user interface, such as graphical user interface (GUI) 112 on board the vehicle to enable the particular speaker selections, sound effects, etc., to be selected by an occupant of the vehicle 100. The GUI 112 may be integrated to control various aspects of the vehicle 100, such as the audio system 104, environmental controls (e.g., climate controls), SVSG system 102, etc.

Figure 2:
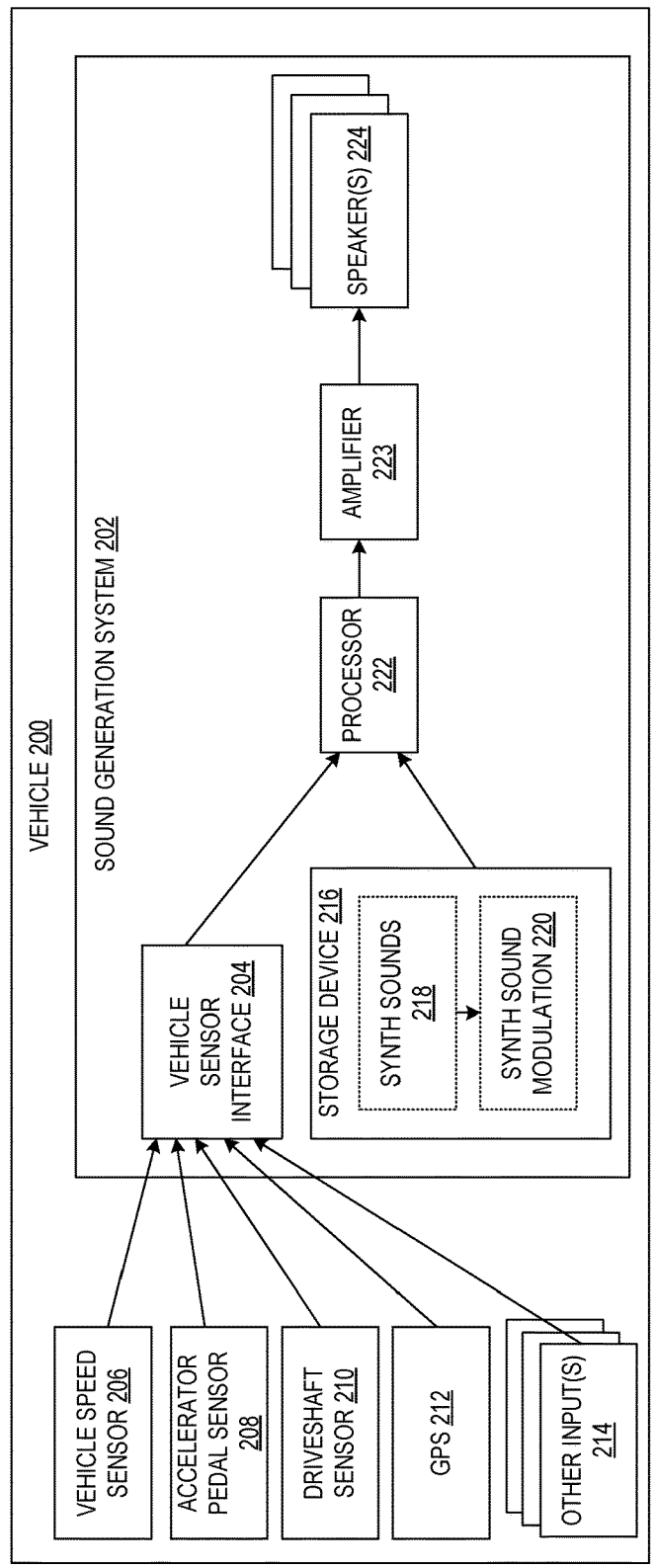
FIG. 2 shows a block diagram of an example sound generation system in accordance with one or more embodiments of the present disclosure.

FIG. 2 shows a block diagram of an example system for generating synthetic sounds in a vehicle 200. The vehicle 200 may be an example of vehicle 100 of FIG. 1. Vehicle 200 includes a sound generation system (SGS) 202, which may be an example of a SVSG system, such as an example of the SVSG system 102 of FIG. 1. Sound generation system 202 includes a vehicle sensor interface 204 for receiving inputs from one or more sensors or other input devices used to control the generation (e.g., modulation) of synthetic sounds in the vehicle. The vehicle sensor interface 204 may be a hardware interface including one or more ports, buses, and/or other hardware elements for receiving and propagating data between the inputs and the sound generation system 202. Example inputs include a vehicle speed sensor 206, an accelerator pedal (or throttle position) sensor 208, a driveshaft sensor 210 (or other rotating shaft), a global positioning system (GPS) 212, and/or one or more other inputs 214.

The vehicle sensor interface may be omitted in certain example configurations that include a small number of input sensors.

The SGS 202 includes a storage device 216, which may store, among other data, one or more synthetic sounds 218 and a synthetic sound modulation module 220. The synthetic sounds 218 may include a database of sound signals representing synthesized sounds for masking vehicle noise and/or one or more of the synthetic sound examples discussed above (e.g., sounds mimicking internal combustion engines, etc.). While shown as residing locally on storage device 216 in FIG. 2, it is to be understood that one or more of the synthetic sounds 218 may be stored externally to storage device 216 (e.g., on a remote server located externally and/or separately/spaced away from the vehicle 200) and retrieved for use by the synthetic sound modulation module 220 in some examples.

The SGS 202 also includes a processor 222 configured to execute instructions from the synthetic sound modulation module 220. For example, the synthetic sound modulation module 220 may include instructions that, when executed by the processor 222, modulate at least a portion of a synthetic sound signal from the synthetic sounds 218 as a function of one or more inputs (e.g., from the inputs 206 through 214, described above) received from the vehicle sensor interface 204. While other systems may modulate all frequencies of a synthetic sound equally, the synthetic sound modulation module 220 may include instructions to modulate only a first portion (e.g., a first range of frequencies) of a selected synthetic sound signal while maintaining a second portion of the selected synthetic sound signal unmodulated (e.g., in a second range of frequencies, lower than the first range). Since lower frequencies may mask undesirable noises from the vehicle/environment, maintaining unmodulated, or substantially less modulated, low frequencies of a synthetic sound signal while modulating high frequencies of the synthetic sound signal may ensure that the undesirable noises remain masked even as the sound is adapted to reflect a changing operating status of the vehicle. The sound modulation module 220 may further include instructions that, when executed by the processor 222, cause an amplifier 223 to drive one or more speakers 224 (e.g., examples of speakers 105 of FIG. 1) to output the combined synthetic sound, which includes both modulated and unmodulated portions. It is to be understood that other examples may apply equal or unequal gain to each of the two frequency ranges (e.g., high and low).

Figure 3:
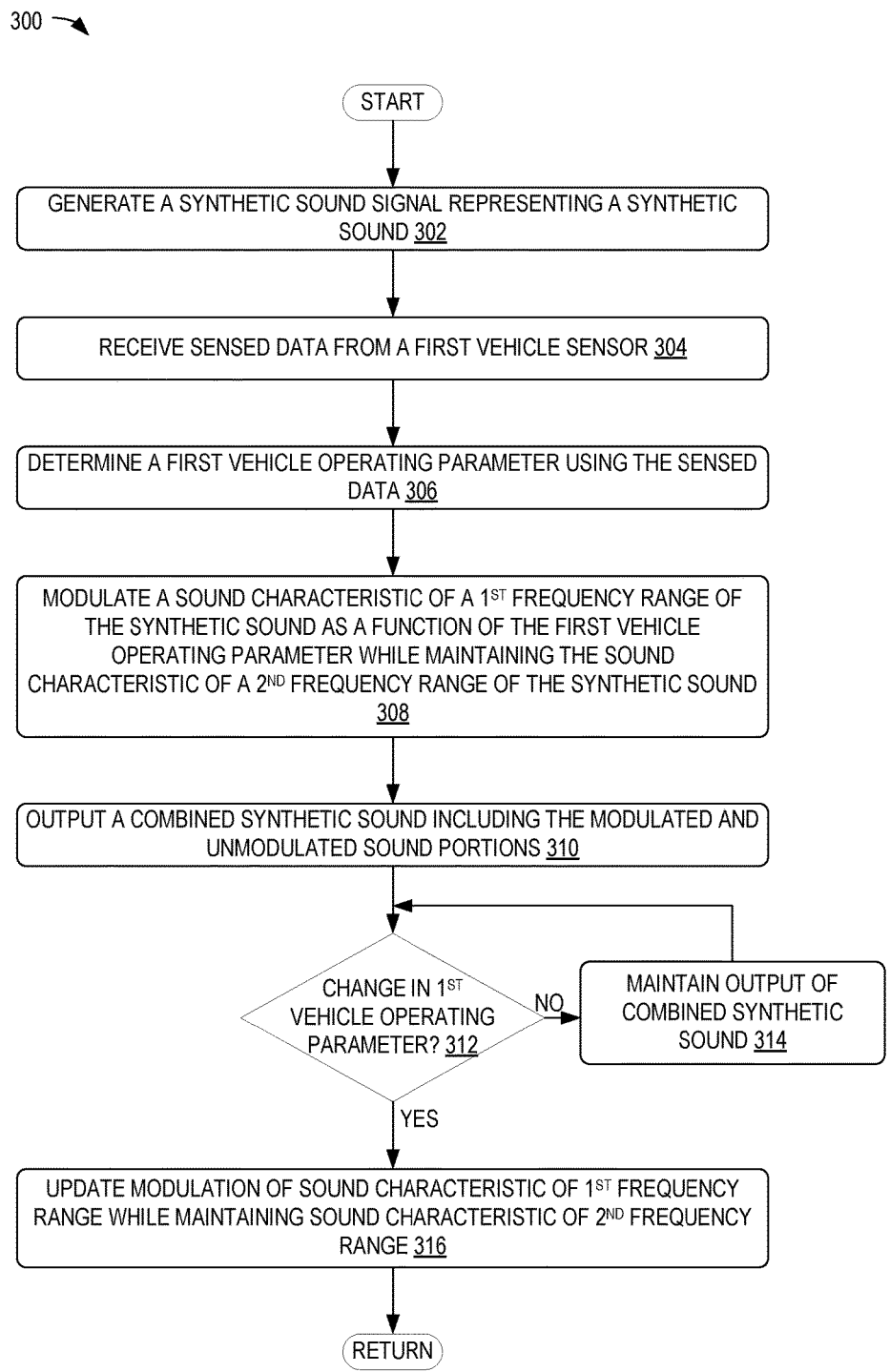
FIG. 3 shows an example method of generating synthetic sounds in a vehicle in accordance with one or more embodiments of the present disclosure.

FIG. 3 shows an example method 300 for generating synthetic sounds in a vehicle. For example, method 300 may be performed by the SVSG system 102 of FIG. 1 and/or the sound generation system 202 of FIG. 2. At 302, the method includes generating a synthetic sound signal representing a synthetic sound. For example, generating the synthetic sound signal may include retrieving the sound signal from a local or remote database and/or passing the retrieved sound signal to an instruction module for processing. The synthetic sound signal may be retrieved responsive to user input selecting the synthetic sound signal from a plurality of available synthetic sound signals, automatically selected based on predefined user preferences regarding synthetic sound signals to use (e.g., universally, or for a given user/vehicle/transmission mode/environmental status), and/or otherwise selected. In other examples, the synthetic signal may be dynamically generated using information from one or more input sources (e.g., user inputs, inputs indicating a vehicle operating status, etc.) to define properties of the sound signal.

At 304, the method includes receiving sensed data from a first vehicle sensor. At 306, the method includes determining a first vehicle operating parameter using the sensed data. For example, the sensed data may include data from a sensor that indicates (e.g., directly) the first vehicle operating parameter (e.g., a vehicle speed sensor that outputs vehicle speed) and/or data from one or more sensors that may be used to calculate the first vehicle operating parameter as a function of the sensor output(s) (e.g., raw output from a wheel or driveshaft-based sensor that is used to calculate vehicle speed using known relationships between the sensed data and other parameters, such as wheel diameter).

At 308, the method includes modulating a sound characteristic of a first frequency range of the synthetic sound as a function of the first vehicle operating parameter while maintaining the sound characteristics of a second frequency range of the synthetic sound. As discussed above, by modulating different frequency ranges of a synthetic sound signal differently, unwanted vehicle noises may continue to be masked (e.g., with unmodulated low frequency portions of the synthetic sound) while an occupant of the vehicle perceives synthetic sounds that change with vehicle operating parameters (e.g., vehicle speed) similarly to sounds in vehicles with combustion engines. Other examples of vehicle operating parameters that may be used to control the sound characteristics of the first frequency range include engine speed/RPM, accelerator pedal input, shaft speed, vehicle speed, engine torque, ambient noise, and/or other parameters.

Figure 4A:
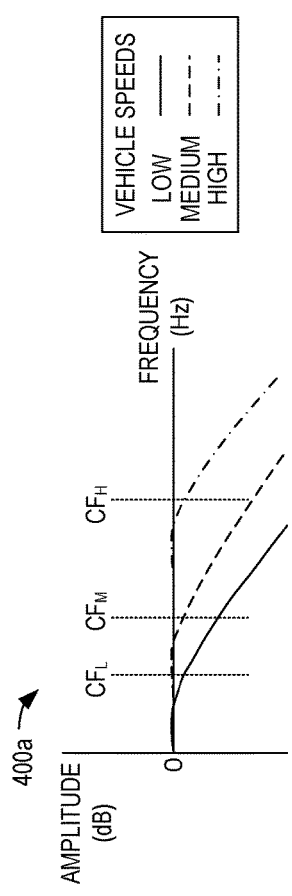
FIG. 4A shows an example sliding low pass filter for generating partially modulated sounds at different vehicle speeds in accordance with one or more embodiments of the present disclosure.
Figure 5:
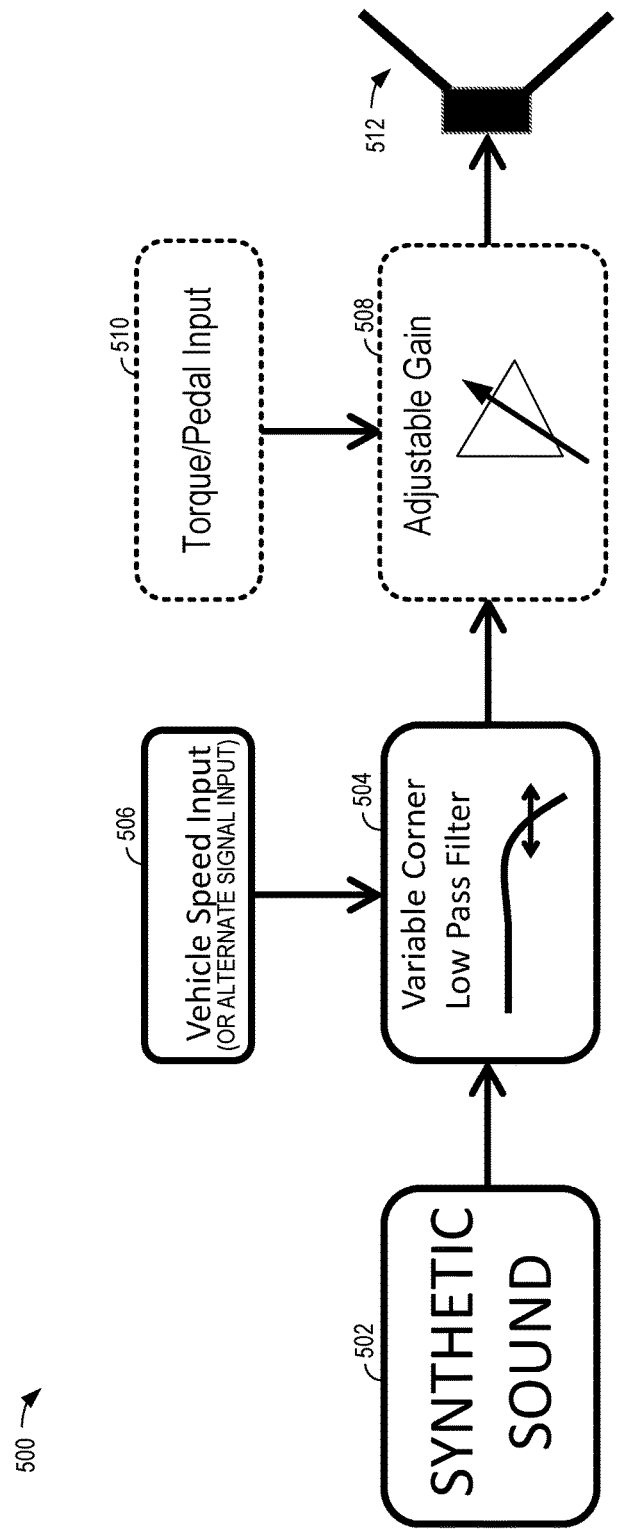
FIG. 5 shows a first example process for modulating sound using a variable corner frequency low pass filter in accordance with one or more embodiments of the present disclosure.
Figure 6A:
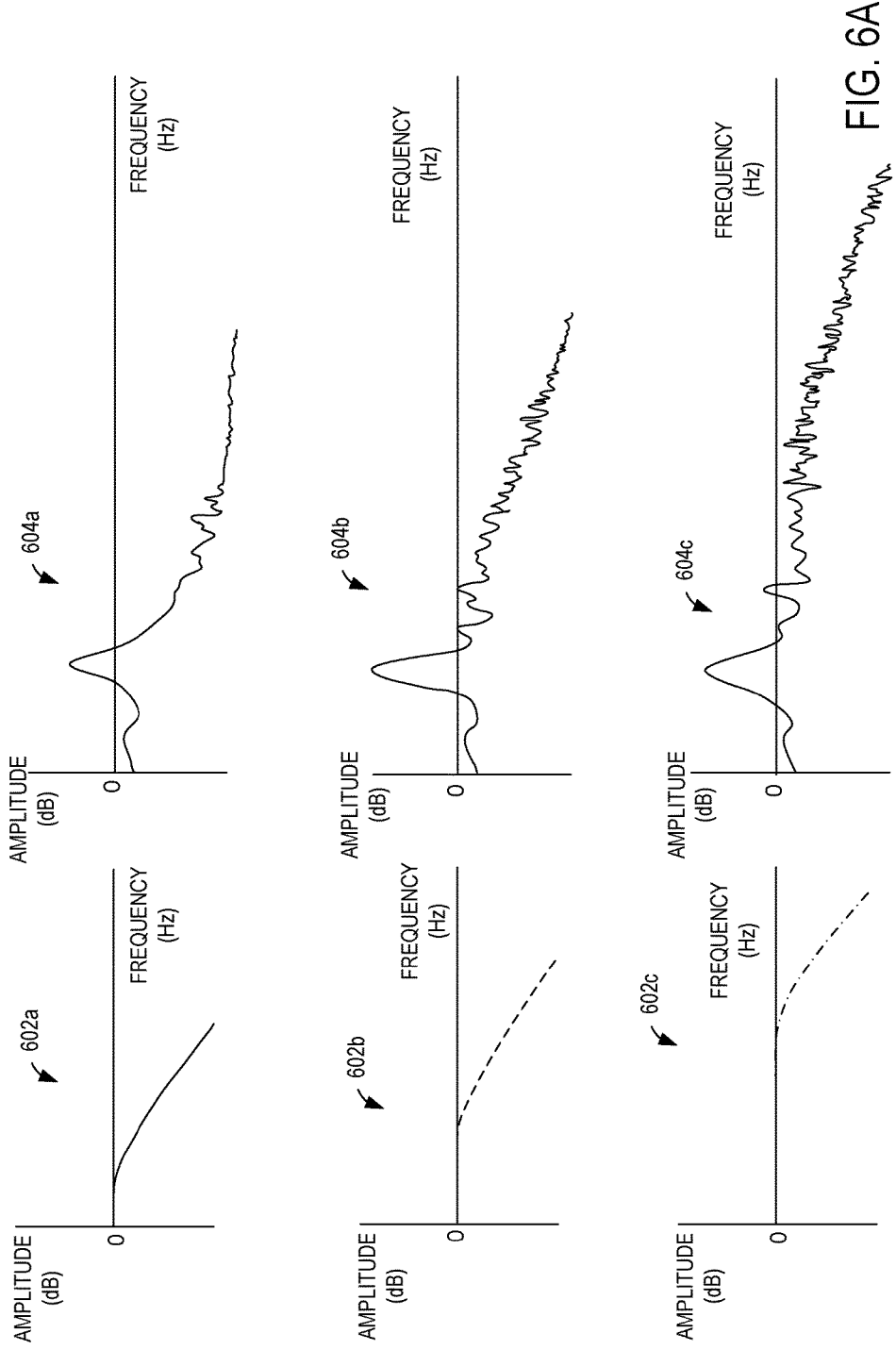
FIGS. 6A and 6B show example low pass filters and associated sound modulation when using the first example process in accordance with one or more embodiments of the present disclosure.

The sound characteristic that is modulated may in one example correspond to a corner frequency of a low pass filter, whereby frequencies above the corner (or cutoff) frequency are modulated (e.g., increasingly attenuated), and frequencies below the corner frequency are unmodulated (e.g., not attenuated). Turning briefly to FIG. 4A, plot 400a shows representations of a sliding low pass filter for different vehicle speeds, with approximate respective corner frequencies shown at $CF_L$ (low speed), $CF_M$ (medium speed), and $CF_H$ (high speed). As shown, the low pass filters attenuate frequencies higher than the corner frequency, and pass frequencies lower than the corner frequency. As vehicle speed increases, progressively more (higher) frequencies are passed with little or no attenuation/modulation (as the corner frequency increases), thereby simulating engine response experienced while increasing vehicle speed in internal combustion engine-driven vehicles. A more detailed description of this example is shown in FIGS. 5 and 6A/6B.

Figure 4B:
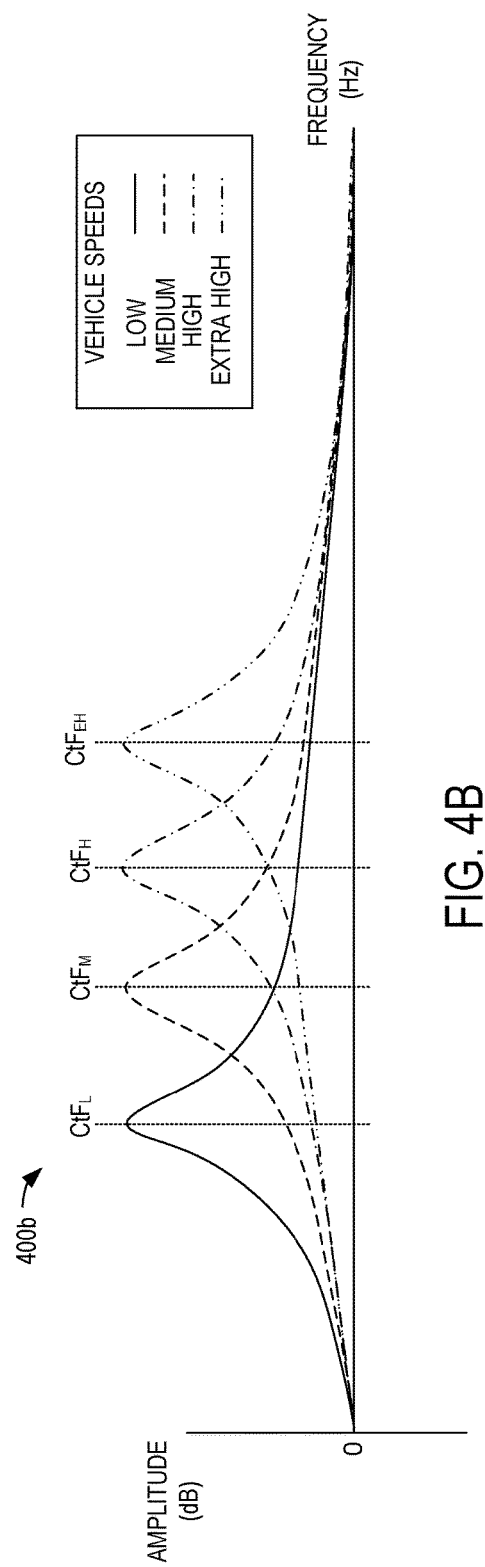
FIG. 4B shows an example sliding peak filter for generating partially modulated sounds at different vehicle speeds in accordance with one or more embodiments of the present disclosure.
Figure 7:
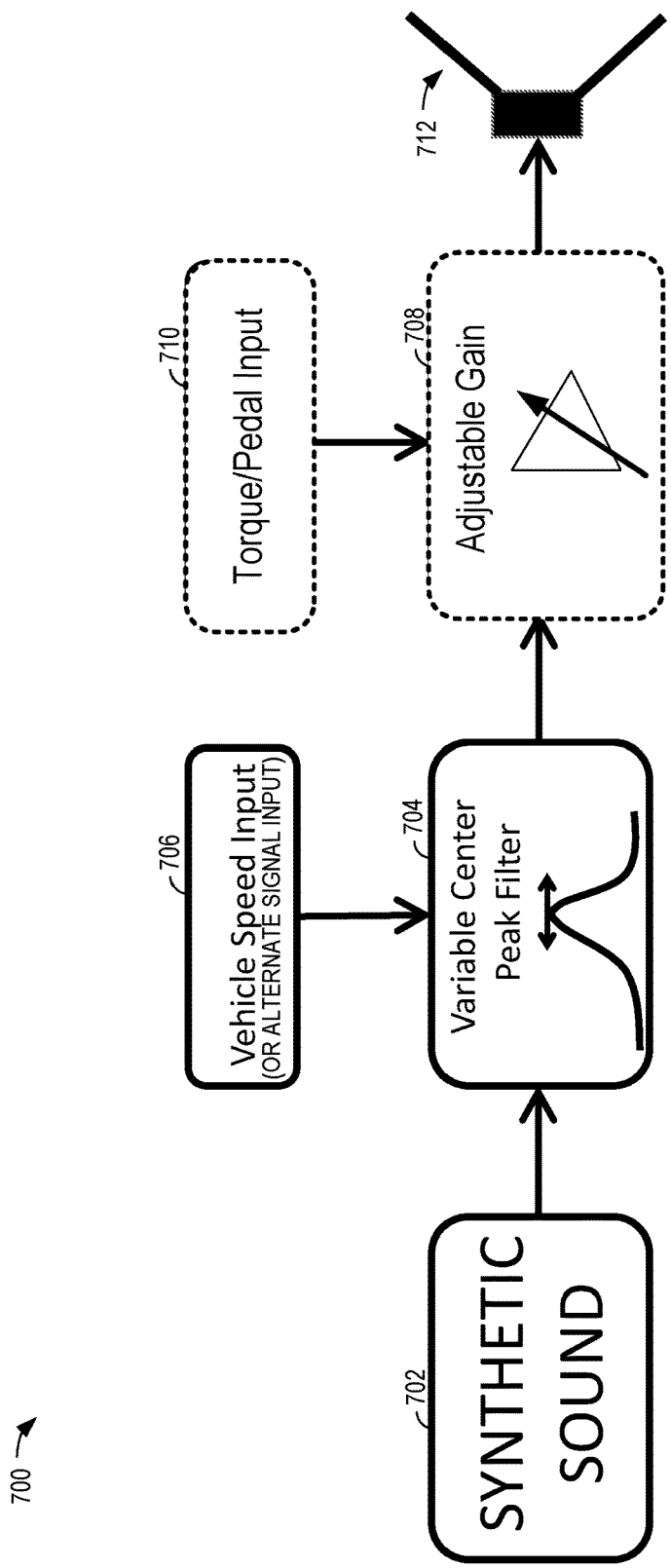
FIG. 7 shows a second example process for modulating sound using a variable center frequency peak filter in accordance with one or more embodiments of the present disclosure.
Figure 8A:
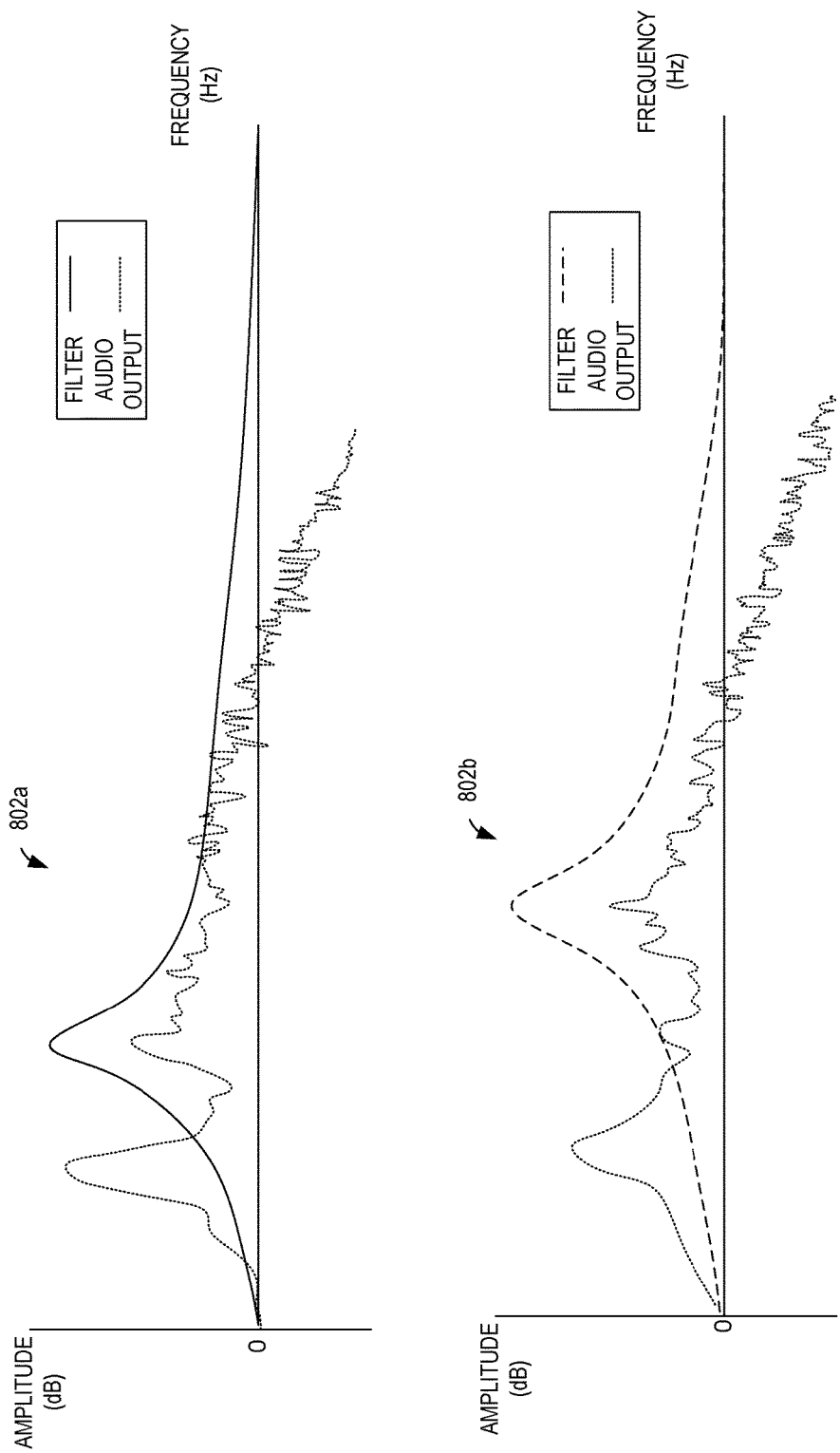
FIGS. 8A, 8B, and 8C show example peak filters and associated sound modulation when using the second example process in accordance with one or more embodiments of the present disclosure.
Figure 8B:
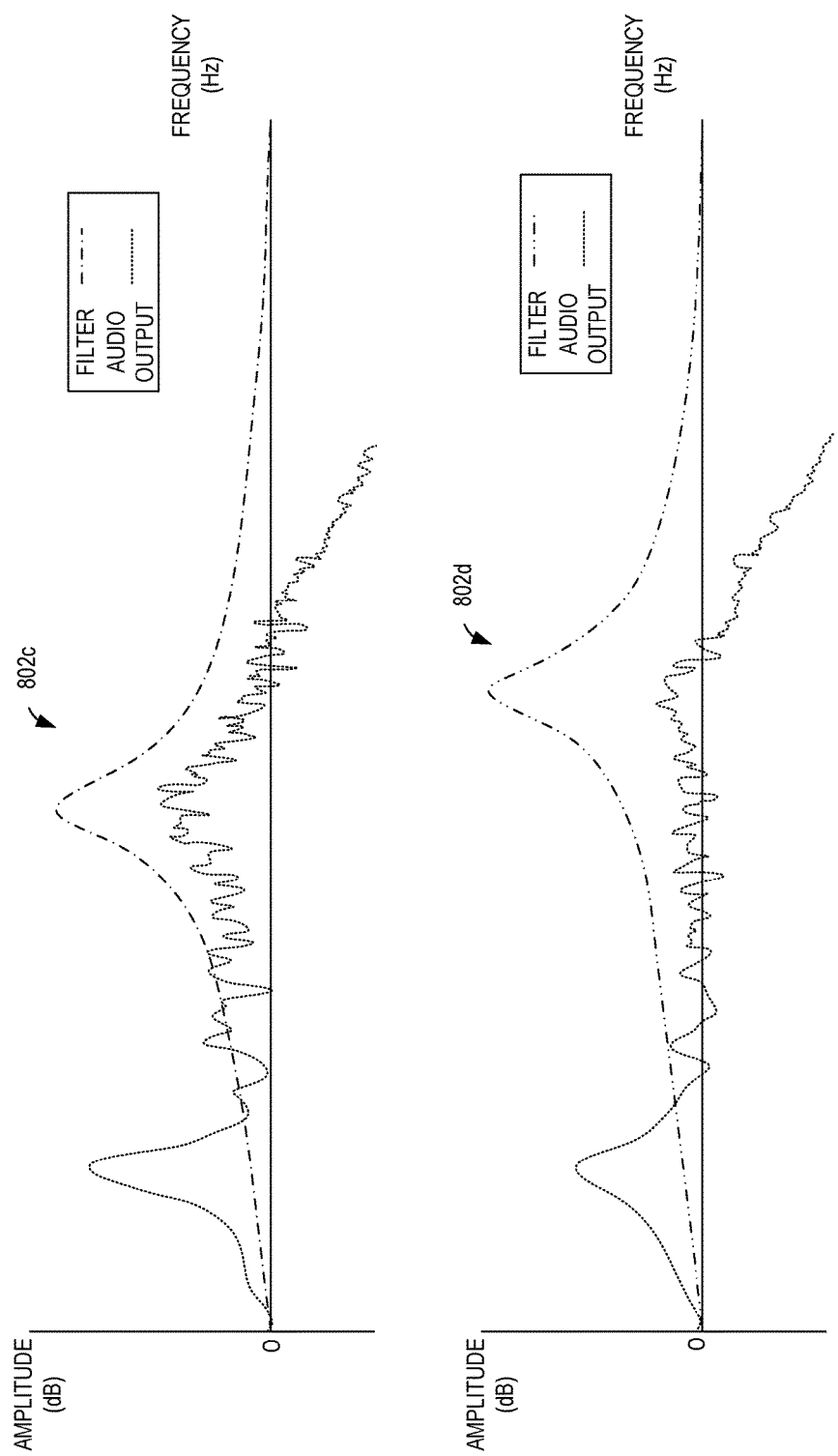

In another example, the sound characteristic that is modulated may correspond to a center frequency of a peak filter. As a non-limiting example, a peak filter with an amplitude as high as 15 dB, or higher, may be moved between a center frequency of 200 Hz to beyond 2 kHz to simulate an increase in vehicle speed. An example sliding peak filter is shown in plot 400b of FIG. 4B, with approximate respective center frequencies shown at $CtF_L$ (low speed), $CtF_M$ (medium speed), $CtF_H$ (high speed), and $CtF_{EH}$ (extra high speed). A more detailed description of this example is shown in FIGS. 7, 8A, and 8B.

Figure 9:
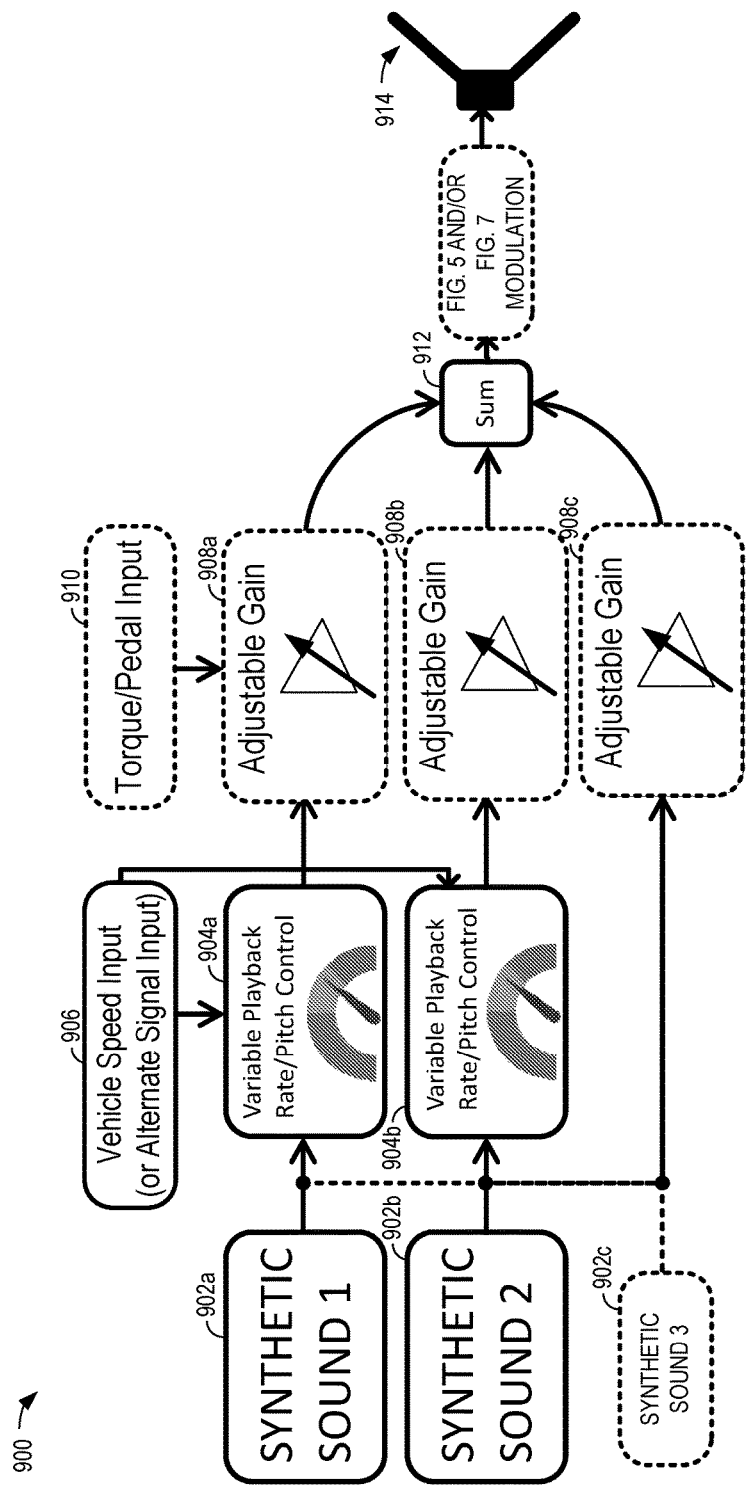
FIG. 9 shows a third example process for modulating sound using multiple audio files in accordance with one or more embodiments of the present disclosure.

In yet another example, the sound characteristic that is modulated based on vehicle operating parameters may be all or a portion of the frequencies of at least a first sound signal, where the modulated first sound signal is mixed with an unmodulated sound signal (e.g., the first sound signal prior to modulation) to produce a combined synthetic sound. The portion of the sound signal with the changes in modulation based on vehicle operating parameters may simulate an increase in vehicle speed (or other change in vehicle operating parameters), while maintaining the noise masking properties of the lower frequencies of the unmodulated sound portions. A more detailed description of this example is shown in FIG. 9.

Returning now to FIG. 3, the method includes outputting a combined synthetic sound including modulated and unmodulated sound portions, as indicated at 310. At 312, the method includes determining whether the first vehicle operating parameter has changed. If no change has occurred (or if a change that is under a threshold associated with a perceptible change in the operating parameter has occurred, e.g., "NO" at 312), the method includes maintaining the output of the combined synthetic sound (e.g., not changing the amount or type of modulation of the sound), as indicated at 314. If a change has occurred (or if a change that is over the above-described threshold has occurred, e.g., "YES" at 312), the method includes updating a modulation of the sound characteristic of the first frequency range while maintaining the sound characteristic of the second frequency range, as indicated at 316. By updating the modulation of the sound characteristics, the combined synthetic sound may continue to simulate the sounds experienced during associated changes of a combustion engine-driven vehicle while maintaining low frequency noise masking properties. The method 300 may continue updating the modulation of the sound characteristics until the sound generation system is interrupted (e.g., parameters of the sound generation are changed, instigating a restart of the method) or shut down (e.g., at vehicle shut down, and/or responsive to a user input).

FIG. 5 shows a first example process 500 for modulating sound using a variable corner frequency low pass filter. The process 500 includes inputting a synthetic sound signal 502 (e.g., an audio file, such as a .wav file, or a bank of oscillators) to a low pass filter 504, where the low pass filter accepts a vehicle speed (or another vehicle operating parameter, such as those discussed above, including shaft RPM, GPS, etc.) input 506 to adjust a corner frequency of the filter. For example, a corner frequency may increase with increasing vehicle speed. As a more detailed example, a linear increase in vehicle speed may be mapped to a logarithmic increase in the corner frequency of the low pass filter. However, it is to be understood that any suitable relationship between vehicle speed and corner frequency adjustment may be utilized to simulate changes in sound responsive to vehicle speed changes.

The vehicle speed input 506 may be received at the filter 504 directly from a vehicle speed sensor (or other vehicle operating parameter sensor) in some examples. In other examples, the vehicle speed (or other vehicle operating parameter) may be calculated indirectly by a parameter determination module using input from one or more sensors. In such examples, the vehicle speed input may be received at the filter 504 from the parameter determination module and/or an associated processing device.

Filtering the synthetic sound signal via the low pass filter includes modulating and/or attenuating a first frequency range (e.g., portion) of the synthetic sound signal (e.g., a high frequency range including frequencies above the corner frequency of the low pass filter) and not modulating and/or not attenuating a second frequency range (e.g., portion) of the synthetic sound signal (e.g., a low frequency range including frequencies that are below the corner frequency of the low pass filter). The low pass filter may include a hardware filter and/or may be implemented using a processing device (e.g., processor 222 of FIG. 2) to execute instructions (e.g., synthetic sound modulation module 220 of FIG. 2) for modulating sound according to the parameters of the low pass filter.

Analog or digital filters may additionally or alternately be used in the example of FIG. 5 to convey a sense of increasing speed through the impression of increasing the amplitude of the increasingly high frequency components of the signal. These filters include, but are not limited to:
  a) a shelf filter with increasing knee frequency;
  b) a band stop filter with increasing Q, and/or increasing center frequency;
  c) a series of negative gain peak filters that either increase in center frequency, and/or whose lowest frequency members are simply omitted with increasing speed;
  d) a series of band stop filters or notches that are either increased in center frequency, and/or whose lowest frequency members are simply omitted with increasing speed;
  e) an adjustable order low pass filter
  f) unequal gain in a first and second frequency range, the transition frequency between which increases, and/or
  g) combinations of the above, or alternate filter types that achieve the above stated goal.

The synthetic sound signal, as filtered by low pass filter 504 (e.g., filtered synthetic sound signal and/or at least partially modulated synthetic sound signal, which includes both the modulated and unmodulated portions of the synthetic sound signal), is then optionally passed to an adjustable gain module 508. The adjustable gain module 508 receives a torque and/or pedal input 510 indicating a driver-requested acceleration or engine output to control the amount of gain applied to the filtered synthetic sound signal. For example, a gain applied to the filtered synthetic sound signal may increase with increasing torque/pedal input. As a more detailed example, the gain applied to the filtered synthetic sound signal may increase linearly with a linear increase in torque/pedal input. The torque/pedal input 510 may be received directly from a sensor, such as an accelerator pedal sensor, a throttle position sensor, and/or any sensor capable of measuring data indicating engine output. In other examples, the torque/pedal input 510 may be received from a processing device or module that calculates a driver-requested acceleration or engine output using information from one or more sensors.

The adjustable gain module 508 may output a combined synthetic sound signal to a speaker 512 (e.g., formed by attenuating a portion of a sound). The speaker 512 may represent any one or more speakers in the vehicle, including integrated vehicle speakers, external vehicle speakers, and/or speakers in communication with the vehicle (e.g., wireless speakers, speakers integrated in mobile devices located in the cabin of the vehicle, etc.). The output combined synthetic sound signal may include modulated portions of the synthetic sound signal 502 (e.g., frequencies above the corner frequency of the low pass filter 504) and unmodulated portions of the synthetic sound signal 502 (e.g., frequencies below the corner frequency of the low pass filter 504), where each of the modulated and unmodulated portions are gain-adjusted according to the adjustable gain module 508.

FIG. 6A shows example low pass filters and associated sound modulation under different vehicle operating parameters (e.g., vehicle speeds) when using the first example process 500 of FIG. 5. For example, plot 602a shows an example low pass filter used at low vehicle speeds. A non-limiting example of a low speed at which the low pass filter of plot 602a may be applied is 25 miles per hour (mph).

Plot 604a shows a low bandwidth sound signal that is output by the low pass filter of plot 602a. As shown, only a small range of frequencies are output (e.g., emphasized) using the low pass filter at low vehicle speeds. Plot 602b shows an example low pass filter used at medium vehicle speeds (e.g., higher than the low vehicle speeds but lower than the high vehicle speeds). A non-limiting example of a medium speed at which the low pass filter of plot 602b may be applied is 45 mph. Plot 604b shows a medium bandwidth sound signal that is output by the low pass filter of plot 602b. As shown, a larger range of frequencies are output using the low pass filter associated with medium vehicle speeds as compared to the frequencies output using the low pass filter associated with low vehicle speeds. Plot 602c shows an example low pass filter used at high vehicle speeds (e.g., higher than the low and medium vehicle speeds). A non-limiting example of a high vehicle speed at which the low pass filter of plot 602c may be applied is 65 mph. Plot 604c shows a high bandwidth sound signal that is output by the low pass filter of plot 602c. As shown, a larger range of frequencies are output using the low pass filter associated with high vehicle speeds as compared to the frequencies output using the low pass filters associated with low and medium vehicle speeds. For the purposes of illustration, the plots 602a, 602b, and 602c may be of approximately the same scale as one another, and the plots 604a, 604b, and 604c may be of approximately the same scale as one another.

Figure 6B:
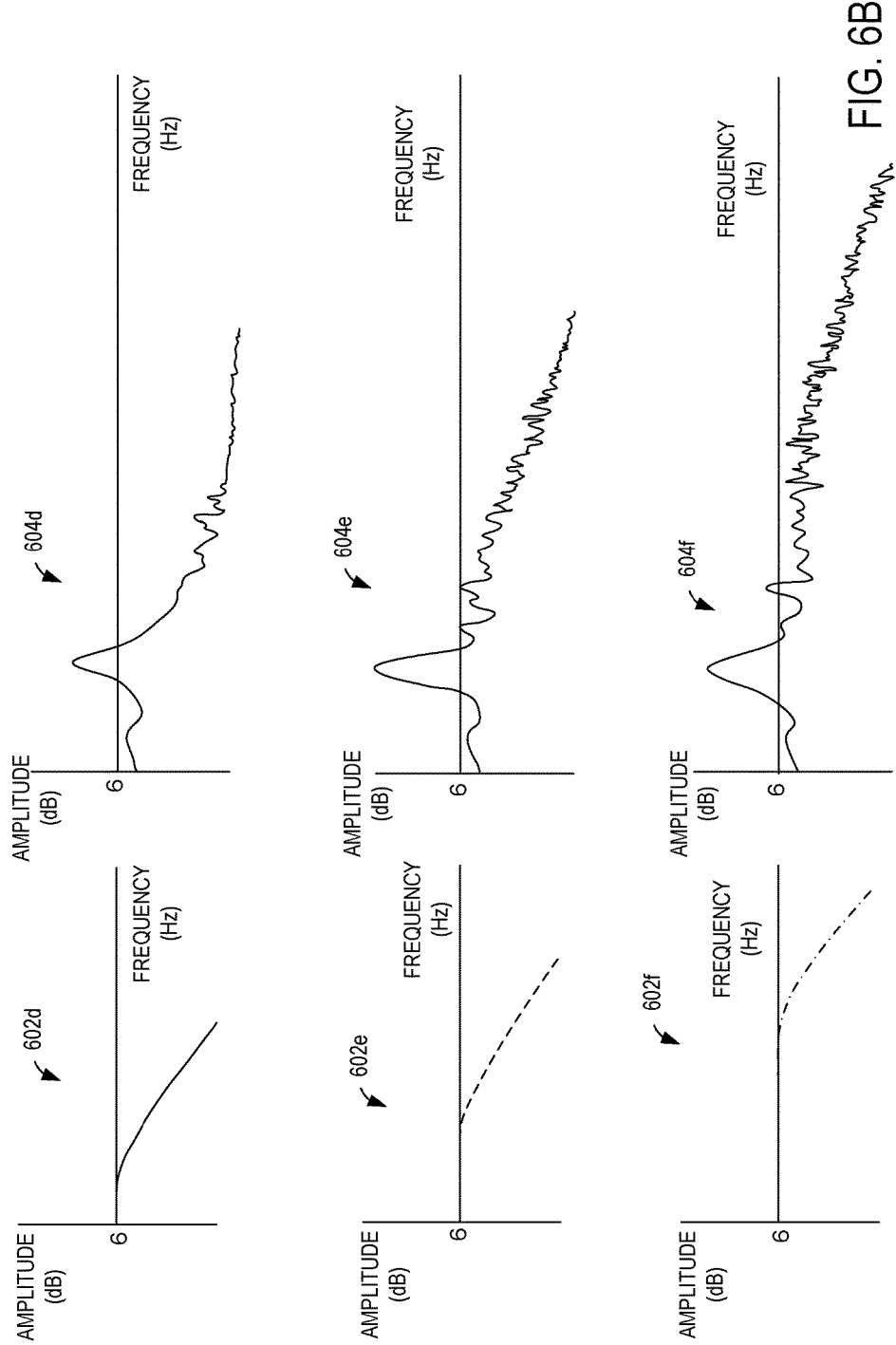

FIG. 6B shows further example low pass filters and associated sound modulation under different vehicle operating parameters (e.g., vehicle speeds) when using the first example process 500 of FIG. 5. In the examples of FIG. 6B, both high and low frequency ranges are modulated by applying a broadband gain. For example, plot 602d shows an example low pass filter with 6 dB of broadband gain, as used at low vehicle speeds. Plot 604d shows a low bandwidth sound signal that is output by the low pass filter of plot 602d. Plot 602e shows an example low pass filter with 6 dB of broadband gain used at medium vehicle speeds (e.g., higher than the low vehicle speeds but lower than the high vehicle speeds). Plot 604e shows a medium bandwidth sound signal that is output by the low pass filter of plot 602e. Plot 602f shows an example low pass filter with 6 dB of broadband gain used at high vehicle speeds (e.g., higher than the low and medium vehicle speeds). Plot 604f shows a high bandwidth sound signal that is output by the low pass filter of plot 602f.

FIG. 7 shows a second example process 700 for modulating sound using a variable center frequency peak filter. The process 700 includes inputting a synthetic sound signal 702 (e.g., an audio file, such as a .wav file, or a bank of oscillators) to a peak filter 704, where the peak filter accepts a vehicle speed (or another vehicle operating parameter) input 706 to adjust a center frequency of the filter. For example, a center frequency may increase with increasing vehicle speed. As a more detailed example, a linear increase in vehicle speed may be mapped to a logarithmic increase in the center frequency of the peak filter. However, it is to be understood that any suitable relationship between vehicle speed and center frequency adjustment may be utilized to simulate changes in combustion engine sound responsive to vehicle speed changes.

The vehicle speed input 706 may be received at the filter 704 directly from a vehicle speed sensor (or other vehicle operating parameter sensor) in some examples. In other examples, the vehicle speed (or other vehicle operating parameter, such as those described above, including pedal position, torque, change in RPM, rate of change in GPS signal, etc.) may be calculated indirectly by a parameter determination module using input from one or more sensors. In such examples, the vehicle speed input may be received at the filter 704 from the parameter determination module and/or an associated processing device.

Filtering the synthetic sound signal via the peak filter includes modulating and/or accentuating a first frequency range (e.g., portion) of the synthetic sound signal (e.g., middle frequency range around the center frequency of the peak filter) and not modulating and/or not attenuating at least a second frequency range (e.g., portion) of the synthetic sound signal (e.g., a low frequency range including frequencies that are outside of the center frequency of the peak filter). The peak filter may include a hardware filter or programmable analog filter (e.g., which does not use a processor) and/or may be implemented using a processing device (e.g., processor 222 of FIG. 2) to execute instructions (e.g., synthetic sound modulation module 220 of FIG. 2) for modulating sound according to the parameters of the peak filter.

Analog or digital filters that may additionally or alternately be used in the example of FIG. 7 instead of conveying a sense of increasing speed by sliding a peak filter up in frequency include:
  a) using a combination of high and low frequency shelf to emphasize the frequency range;
  b) using a narrow band pass filter rather than a peak filter;
  c) using a series of negative gain peak filters to de-emphasize frequencies in all the ranges except the frequency range to emphasize;
  d) using a high and low pass filter to create the emphasized frequency range, and summing this signal with an optional gain with a version of the original signal; and/or
  e) combinations of the above, or alternate filter types that achieve the above stated goal.

The synthetic sound signal, as filtered by peak filter 704 (e.g., filtered synthetic sound signal and/or at least partially modulated synthetic sound signal, which includes both the modulated and unmodulated portions of the synthetic sound signal), is then optionally passed to an adjustable gain module 708. The adjustable gain module 708 receives a torque and/or pedal input 710 indicating a driver-requested acceleration or engine output to control the amount of gain applied to the filtered synthetic sound signal. For example, a gain applied to the filtered synthetic sound signal may increase with increasing torque/pedal input. As a more detailed example, the gain applied to the filtered synthetic sound signal may increase linearly with a linear increase in torque/pedal input. The torque/pedal input 710 (or other signal indicative of acceleration/deceleration) may be received directly from a sensor, such as an accelerator pedal sensor, a throttle position sensor, and/or any sensor capable of measuring data indicating engine output. In other examples, the torque/pedal input 710 may be received from a processing device or module that calculates a driver-requested acceleration or engine output using information from one or more sensors.

In an optional stage, the adjustable gain module 708 may output a combined synthetic sound signal to a speaker 712. The speaker 712 may represent any one or more speakers in the vehicle, including integrated vehicle speakers, external vehicle speakers, and/or speakers in communication with the vehicle (e.g., wireless speakers, speakers integrated in mobile devices located in the cabin of the vehicle, etc.). The output combined synthetic sound signal may include modulated portions of the synthetic sound signal 702 (e.g., frequencies around the center frequency of the peak filter 704) and unmodulated portions of the synthetic sound signal 702 (e.g., frequencies outside of the center frequency range of the peak filter 704), where each of the modulated and unmodulated portions are gain-adjusted according to the adjustable gain module 708.

FIGS. 8A and 8B show example peak filters and associated sound modulation under different vehicle operating parameters (e.g., vehicle speeds) when using the second example process 700 of FIG. 7. For example, plot 802a of FIG. 8A shows an example peak filter used at low vehicle speeds overlaid over a sound signal output by that peak filter. As shown, the peak filter used at low vehicle speeds has a low peak center frequency, emphasizing an associated relatively low frequency band of the sound output (e.g., a 160 Hz band). Plot 802b of FIG. 8A shows an example peak filter used at medium vehicle speeds (e.g., higher than the low vehicle speeds) overlaid over a sound signal output by that peak filter. As shown, the peak filter used at medium vehicle speeds has a medium center frequency (higher than the center frequency of the peak filter used for low vehicle speeds), emphasizing an associated relatively medium frequency band of the sound output (e.g., a 250 Hz band).

Plot 802c of FIG. 8B shows an example peak filter used at high vehicle speeds (e.g., higher than the low and medium vehicle speeds) overlaid over a sound signal output by that peak filter. As shown, the peak filter used at high vehicle speeds has a high center frequency (higher than the center frequencies of the peak filters used for low and medium vehicle speeds), emphasizing an associated relatively high frequency band of the sound output (e.g., a 500 Hz band). Plot 802d of FIG. 8B shows an example peak filter used at extra high vehicle speeds (e.g., higher than the low, medium, and high vehicle speeds) overlaid over a sound signal output by that peak filter. A non-limiting example of an extra high vehicle speed at which the peak filter of plot 802d is used may be 75 mph. As shown, the peak filter used at extra high vehicle speeds has an extra high center frequency (higher than the center frequencies of the peak filters used for low, medium, and high vehicle speeds), emphasizing an associated extra high frequency band of the sound output (e.g., a 1 kHz band). In one example, each peak filter of plots 802a through 802d may have an amplitude of approximately 15 dB at an associated center frequency. For the purposes of illustration, the plots 802a, 802b, 802c, and 802d may be of approximately the same scale as one another.

Figure 8C:
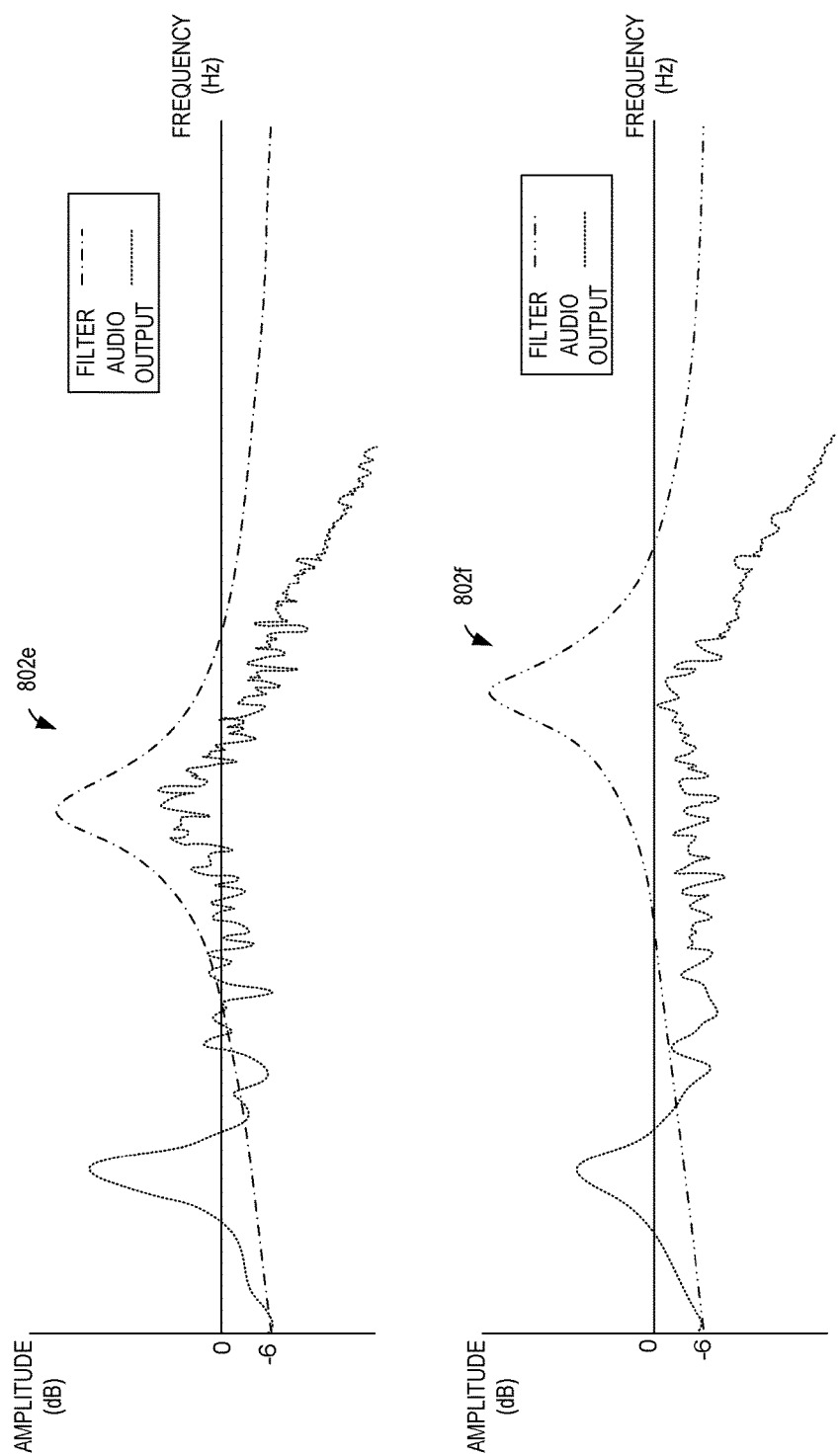

FIG. 8C shows further example peak filters and associated sound modulation under different vehicle operating parameters (e.g., vehicle speeds) when using the second example process 700 of FIG. 7. In the examples of FIG. 8C, both high and low frequency ranges are modulated by applying a full-band or broadband gain. For example, plot 802e may correspond to the operating conditions of plot 802c of FIG. 8B, where instead a peak filter also having −6 dB of broadband gain is applied. As shown, the regions of the filter plot below 0 dB represent areas of both high and low frequencies of the audio signal that are modulated. Similarly, plot 802f may correspond to the operating conditions of plot 802d of FIG. 8B, where instead a peak filter also having −6 dB of broadband gain is applied.

FIG. 9 shows a third example process 900 for modulating sound using multiple audio files and/or multiple versions of an audio file mixed together. The process 900 includes inputting a first synthetic sound signal 902a to a first variable playback rate and/or pitch control module 904a, where the playback rate and/or pitch control module accepts a vehicle speed (or another vehicle operating parameter) input 906 to adjust the rate and/or pitch control applied to the synthetic sound signal. For example, a playback rate and/or pitch of the input synthetic sound signal may increase with increasing vehicle speed. As a more detailed example, a linear increase in vehicle speed may be mapped to a logarithmic or linear increase in the playback rate and/or pitch adjustment applied to the synthetic sound signal. However, it is to be understood that any suitable relationship between vehicle speed and playback rate/pitch adjustment may be utilized to simulate changes in combustion engine sound (or other simulated sounds, such as simulated sounds of other types of engines) responsive to vehicle speed changes.

In some examples, one or more additional synthetic sound signals (e.g., additional audio files for synthetic sounds) may be input to one or more additional variable playback rate/pitch control modules. For example, FIG. 9 shows a second synthetic sound signal 902b input to a second playback rate/pitch control modulate 904b. The second synthetic sound signal 902b may be different from the first synthetic sound signal 902a (e.g., the second synthetic sound signal may represent a different type of sound). For example, the first synthetic sound signal may represent a simulated combustion engine while the second synthetic sound signal may represent a white noise sound. As another example, the first synthetic sound signal may represent a simulation of an engine of a road vehicle while the second synthetic sound signal may represent a simulation of a sound of a rocket or space shuttle. In other examples, the second synthetic sound signal 902b may be derived from the first synthetic sound signal 902a. For example, the second synthetic sound signal may be a distorted version of the first synthetic sound signal. The variable playback rate/pitch control modules 904a and 904b may be the same as one another in some examples. In other examples, the playback rate/pitch control modules may be different for each synthetic sound signal input. In this way, an adjustment to playback rate and/or pitch may be tailored for each synthetic sound signal.

The vehicle speed input 906 may be received at the playback rate/pitch controls 904a and 904b directly from an associated sensor or calculated indirectly and received from a processing device/module as discussed above with respect to FIGS. 5 and 7. The playback rate/pitch adjustment module may include hardware elements and/or may be implemented using a processing device (e.g., processor 222 of FIG. 2) to execute instructions (e.g., synthetic sound modulation module 220 of FIG. 2) for modulating sound signals according to the parameters of the playback rate/pitch control modules.

The synthetic sound signals, as adjusted by playback rate/pitch control modules 904a and 904b (e.g., modulated synthetic sound signals corresponding to each sound input), are then passed to respective adjustable gain modules 908a and 908b. The optional adjustable gain modules 908a and 908b receive a torque and/or pedal input 910 indicating a driver-requested acceleration or engine output to control the amount of gain applied to the filtered synthetic sound signal. For example, a gain applied to the modulated sound signals may increase with increasing torque/pedal input. As a more detailed example, the gain applied to the modulated synthetic sound signals may increase linearly with a linear increase in torque/pedal input. The torque/pedal input 910 may be received directly from a sensor and/or from a processing device or module, as described above with respect to FIGS. 5 and 7.

As shown, an unmodulated synthetic sound signal is also input into an adjustable gain module 908c. The unmodulated synthetic sound signal may correspond to the first synthetic sound signal 902a (prior to modulation via playback rate/ pitch control module 904*a*), the second synthetic sound signal 902*b* (prior to modulation via playback rate/pitch control module 904*b*), or another (unmodulated) synthetic sound signal 902*c* that is different form the first and second synthetic sounds signal 902*a* and 902*b*. The unmodulated synthetic sound signal 902*c* thus remains unmodulated independent of the vehicle speed (or other vehicle operating parameter).

The optional adjustable gain modules 908*a*, 908*b*, and 908*c* may be different from one another (e.g., have a different mapping of torque/pedal input to amount of gain applied) in some examples. In other examples, the adjustable gain modules may be the same as one another (e.g., have a same mapping of torque/pedal input to amount of gain applied). The output of the adjustable gain modules 908*a*, 908*b*, and 908*c* may be combined in a mixer or summing module 912 to produce a combined synthetic sound signal. In some examples, the outputs of each adjustable gain module may be represented equally in the combined synthetic sound signal (e.g., the signals may be mixed evenly), whereas in other examples one or more outputs may be emphasized relative to one or more other outputs. The combined synthetic sound signal may be output directly to a speaker 914. The speaker 914 may represent any one or more speakers in the vehicle, including integrated vehicle speakers, external vehicle speakers, and/or speakers in communication with the vehicle (e.g., wireless speakers, speakers integrated in mobile devices located in the cabin of the vehicle, etc.). The output combined synthetic sound may include modulated portions of the synthetic sound signals 902*a* and 902*b* and unmodulated portions of the synthetic sound signal 902*c*, where each of the modulated and unmodulated portions are gain-adjusted according to the adjustable gain modules 908*a* through 908*c*. Alternatively, synthetic sound from sound signal 902*b* may be omitted, and only sound signals 902*a* and 902*c* may be combined.

Any of the above-described example modulation processes may be combined in any suitable manner. For example, the modulation described with respect to FIGS. 5 and/or 7 may be performed using the combined synthetic signal output of mixer/summing module 912 as an input (e.g., replacing synthetic sound signal 502 and/or 702 of FIGS. 5 and 7, respectively). Where both of the modulations of FIGS. 5 and 7 are used with the modulation of FIG. 9, the modulations may occur in either order (e.g., where the output of mixer/summing module 912 is passed through the low pass filter of FIG. 5 then the peak filter of FIG. 7, or through the peak filter of FIG. 7 then the low pass filter of FIG. 5). Furthermore, optional gain adjustment may be performed after passing the signal through each filter, after performing both filtering operations (e.g., after filtering with the low pass filter of FIG. 5 and the peak filter of FIG. 7), or omitted (since the gain is adjusted with modules 908*a* through 908*c*).

As another example, the FIG. 5 and/or FIG. 7 modulation described above may be performed at a different time in the process 900 of FIG. 9. For example, the output of the variable playback rate and/or pitch control modulates 904*a* and 904*b* may be applied to the filters of FIGS. 5 and/or 7 (in either order), and then gain adjusted using modules 908*a* and 908*b* and combined with the gain adjusted unmodulated signal output of module 908*c* for generating a combined synthetic sound signal for output by speaker 914. In still other examples, either or both of the FIG. 5 and FIG. 7 modulation may provide any one or more of the inputs to the process 900. For example, any one or more of the first, second, and/or third synthetic signal 902*a*, 902*b*, or 902*c* may correspond to any one or both of the combined synthetic sound signal output by process 500 and/or 700 of FIGS. 5 and 7. Furthermore, the combined synthetic sound signal output by processes 500 and 700 of FIGS. 5 and 7 may be mixed and used as one or more of the synthetic sound inputs 902*a*, 902*b*, and/or 902*c* of FIG. 9. In still other examples, the modulation described above with respect to FIGS. 5 and 7 may be used in combination (e.g., in any order, such as the examples described above) to generate a combined synthetic sound signal for output by an associated speaker(s) without performing the process 900 of FIG. 9. In each example combination of modulation processes, at least a portion of a sound signal may be maintained as substantially unmodulated in order to continue largely masking low frequency noises of a vehicle, even as other portions of the sound signal are modulated to provide audible feedback of changes in vehicle operating parameters (e.g., vehicle speed, torque/pedal input, etc.).

Some modifications and/or additions to one or more of the above-described examples may be made without departing from the scope of the disclosure. For example, in place of the various examples of playback audio provided above, one or more of the described approaches may include using real-time audio synthesis, including using an accelerometer or microphone to sense actual vehicle sounds that naturally modulate with vehicle speed. In such examples, the lowest frequency portion of the signal may be amplified to provide a masking signal. Additionally or alternatively, harmonic content of the sounds may be detected, and ever lower harmonic orders (half-orders, quarter orders, etc.) may be synthesized to provide an acoustic masking signal at low frequency.

As another example, an active masking level calculation module may be included in any one or more of the above described systems. Using known information regarding masking thresholds and levels, an algorithm may be generated that automatically determines suitable levels of low frequency content sufficient to mask transient and other undesirable vehicle noise, vibration, and harshness.

Furthermore, although the above-described examples related to the masking of low frequency noises, some vehicles may exhibit undesirable high frequency noises, such as electric motor whine, that may be masked. In such cases, additional acoustic sound in this high frequency range (e.g., higher than the low frequencies masked in the above-described examples) may be emphasized using any one of the methods disclosed herein or any combination of the methods disclosed herein to mask the undesirable high frequency noise. In such examples, both low frequency and high frequency noises may be masked simultaneously. Alternatively, the frequency ranges that are modulated and unmodulated may be interchanged in the above-described examples in order to achieve the high frequency noise masking.

The technology and methods described herein may be used in conjunction with other noise cancelling technologies, such as road noise cancellation (RNC). The goal of RNC systems is to reduce the noise due to the interaction of the tires of a vehicle with pavement. This noise has both airborne and structure borne paths to the ears of the occupants of the vehicle. RNC systems typically reduce the audible noise in the band from 30 up to 400 Hz or higher. Sound in at least a portion of this frequency range may mask other undesirable steady state and transient NVH sounds. Therefore in some examples, the additional NVH masking sound comes from a reduction in the performance of the RNC system over a portion of its operating frequency range.

In certain cases, it may be useful to implement negative cancellation, which is actual road noise addition over a small frequency range in order to provide additional masking of unwanted vehicle NVH.

Figure 10:
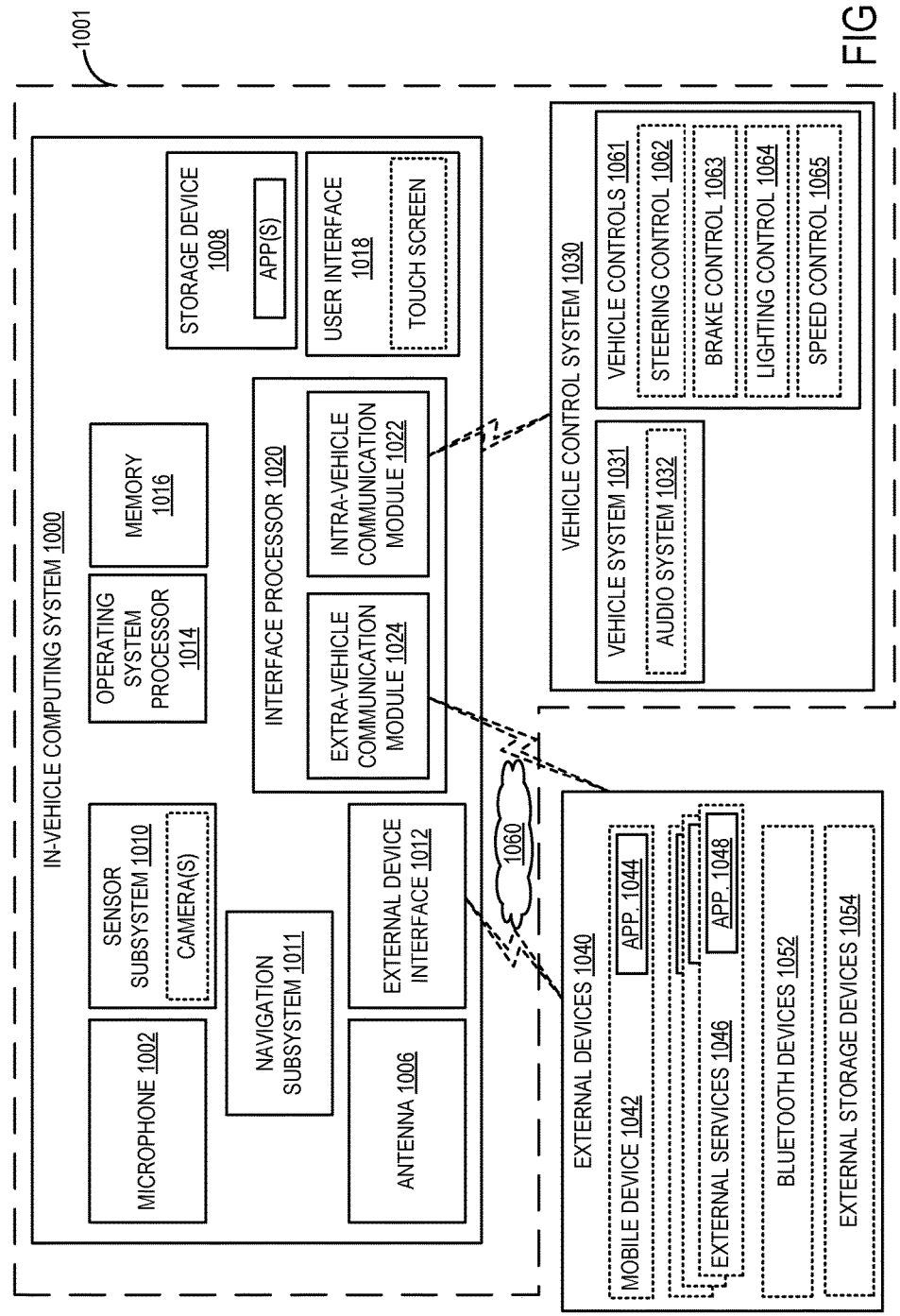
FIG. 10 shows an example block diagram of an in-vehicle computing system in accordance with one or more embodiments of the present disclosure.

FIG. 10 shows an example block diagram of an in-vehicle computing system 1000 configured and/or integrated inside vehicle 1001. In-vehicle computing system 1000 may be an example of and/or include audio system 104 and/or SVSG system 102 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 1001 in order to enhance an in-vehicle experience for a driver and/or a passenger.

In-vehicle computing system 1000 may include one or more processors including an operating system processor 1014 and an interface processor 1020. Operating system processor 1014 may execute an operating system on the in-vehicle computing system, and control input/output, display, playback, and other operations of the in-vehicle computing system. Interface processor 1020 may interface with a vehicle control system 1030 via an intra-vehicle communication module 1022. System 1000 may be remote from the vehicle, or may run on an accessory device connected wirelessly or in a wired manner to the vehicle.

In other examples, a processor may not be used for implementation of the methods and systems described herein. For example, audio files may be stored on analog tape, and use only an electromagnetic transducer to play back at various speeds, controlled by a control voltage derived from a shaft RPM or other speed sensor. Further, analog circuitry may be used to shift the corner or center frequency of filters based on speed sensor output voltage. In still other examples, digital potentiometers may be controlled by a microcontroller to shift the corner or center frequency of filters.

Intra-vehicle communication module 1022 may output data to other vehicle systems 1031 and vehicle control elements 1061, while also receiving data input from other vehicle components and systems 1031, 1061, e.g. By way of vehicle control system 1030. When outputting data, intra-vehicle communication module 1022 may provide a signal via a bus corresponding to any status of the vehicle, the vehicle surroundings (e.g., as measured by one or more microphones or cameras mounted on the vehicle), or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), and digital signals propagated through vehicle data networks (such as an engine controller area network [CAN] bus through which engine related information may be communicated and/or an audio-video bridging [AVB] network through which vehicle information may be communicated). For example, the in-vehicle computing system may retrieve from the engine CAN bus the current speed of the vehicle estimated by the wheel sensors, a current location of the vehicle provided by the GPS sensors, and a current trajectory of the vehicle provided by one or more inertial measurement sensors in order to determine a status of the vehicle (e.g., for adjusting modulation of sound signals output by vehicle speakers to mask vehicle noise and/or simulate an internal combustion engine response to the status of the vehicle). In addition, other interfacing means such as Ethernet or Bluetooth may be used as well without departing from the scope of this disclosure.

A non-volatile storage device 1008 may be included in in-vehicle computing system 1000 to store data such as instructions executable by processors 1014 and 1020 in non-volatile form. The storage device 1008 may store application data to enable the in-vehicle computing system 1000 to perform any of the above-described methods and/or to run an application for connecting to a cloud-based server and/or collecting information for transmission to the cloud-based server (e.g., to retrieve synthetic sound signals for modulation). Connection to a cloud-based server may be mediated via extra-vehicle communication module 1024. The application may retrieve information gathered by vehicle systems/sensors, input devices (e.g., user interface 1018), devices in communication with the in-vehicle computing system (e.g., a mobile device connected via a Bluetooth link), etc. In-vehicle computing system 1000 may further include a volatile memory 1016. Volatile memory 1016 may be random access memory (RAM). Non-transitory storage devices, such as non-volatile storage device 1008 and/or volatile memory 1016, may store instructions and/or code that, when executed by a processor (e.g., operating system processor 1014 and/or interface processor 1020), controls the in-vehicle computing system 1000 to perform one or more of the actions described in the disclosure.

A microphone 1002 may be included in the in-vehicle computing system 1000 to measure ambient noise in the vehicle, to measure ambient noise outside the vehicle, etc. The microphone 1002 and/or any other connected microphone may be used to measure other acoustic properties of the field as well. One or more additional sensors may be included in and/or communicatively coupled to a sensor subsystem 1010 of the in-vehicle computing system 1000. For example, the sensor subsystem 1010 may include and/or be communicatively coupled to a camera, such as a rear view camera for assisting a user in parking the vehicle, a cabin camera for identifying a user, and/or a front view camera to assess quality of the route segment ahead. The camera(s) in communication with the sensor subsystem 1010 may be one source of input controlling one or more parameters of any of the sound adjustment described in the disclosure. For example, the identification of the user via the cabin camera may be used to select user preferences for the sound adjustment as associated with the identified user. Sensor subsystem 1010 of in-vehicle computing system 1000 may communicate with and receive inputs from various vehicle sensors and may further receive user inputs. While certain vehicle system sensors may communicate with sensor subsystem 1010 alone, other sensors may communicate with both sensor subsystem 1010 and vehicle control system 1030, or may communicate with sensor subsystem 1010 indirectly via vehicle control system 1030. Sensor subsystem 1010 may serve as an interface (e.g., a hardware interface) and/or processing unit for receiving and/or processing received signals from one or more of the sensors described in the disclosure.

A navigation subsystem 1011 of in-vehicle computing system 1000 may generate and/or receive navigation information such as location information (e.g., via a GPS sensor and/or other sensors from sensor subsystem 1010), route guidance, traffic information, and/or provide other navigational services for the driver. The navigation subsystem 1011 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 1011 may communicate with motion and rotation sensors included in the sensor subsystem 1010. Alternatively, the navigation subsystem 1011 may include motion and rotation sensors and determine the movement and rotation based on the output of these sensors. Navigation subsystem 1011 may transmit data to, and receive data from a cloud-based server and/or external navigation service via extra-vehicle communication module 1024.

External device interface 1012 of in-vehicle computing system 1000 may be coupleable to and/or communicate with one or more external devices 1040 located external to vehicle 1001. While the external devices are illustrated as being located external to vehicle 1001, it is to be understood that they may be temporarily housed in vehicle 1001, such as when the user is operating the external devices while operating vehicle 1001. In other words, the external devices 1040 are not integral to vehicle 1001. The external devices 1040 may include a mobile device 1042 (e.g., connected via a Bluetooth, NFC, WIFI direct, or other wireless connection) or an alternate Bluetooth-enabled device 1052. Mobile device 1042 may be a mobile phone, smart phone, wearable devices/sensors that may communicate with the in-vehicle computing system via wired and/or wireless communication, or other portable electronic device(s). Other external devices include external services 1046. For example, the external devices may include extra-vehicular devices that are separate from and located externally to the vehicle. Still other external devices include external storage devices 1054, such as solid-state drives, pen drives, USB drives, etc. External devices 1040 may communicate with in-vehicle computing system 1000 either wirelessly or via connectors without departing from the scope of this disclosure. For example, external devices 1040 may communicate with in-vehicle computing system 1000 through the external device interface 1012 over network 1060, a universal serial bus (USB) connection, a direct wired connection, a direct wireless connection, and/or other communication link.

One or more applications 1044 may be operable on mobile device 1042. As an example, mobile device application 1044 may be operated to monitor an environment of the vehicle (e.g., collect audio and/or visual data of an environment of the vehicle) and/or to process audio and/or visual data received from vehicle sensors. The collected/processed data may be transferred by application 1044 to external device interface 1012 over network 1060. Likewise, one or more applications 1048 may be operable on external services 1046. As an example, external services applications 1048 may be operated to aggregate and/or analyze data from multiple data sources. For example, external services applications 1048 may aggregate data from the in-vehicle computing system (e.g., sensor data, log files, user input, etc.), etc. the collected data may be transmitted to another paired device via a Bluetooth connection.

Vehicle control system 1030 may include controls for controlling aspects of various vehicle systems 1031 involved in different in-vehicle functions. These may include, for example, controlling aspects of vehicle audio system 1032 for providing audio output to the vehicle occupants. Audio system 1032 may include one or more acoustic reproduction devices including electromagnetic transducers such as speakers (e.g., one or more of the speakers 105 of FIG. 1). In some examples, in-vehicle computing system 1000 may be the only audio source for the acoustic reproduction device or there may be other audio sources that are connected to the audio reproduction system (e.g., external devices such as a mobile phone) to produce audio outputs, such as one or more of the audible alerts described above. The connection of any such external devices to the audio reproduction device may be analog, digital, or any combination of analog and digital technologies.

Vehicle control system 1030 may also include controls for adjusting the settings of various vehicle controls 1061 (or vehicle system control elements) related to the engine and/or auxiliary elements within a cabin of the vehicle, such as steering controls 1062, brake controls 1063, lighting controls 1064 (e.g., cabin lighting, external vehicle lighting, light signals), and speed controls 1065 (e.g., accelerator pedal, torque control, etc.). Vehicle controls 1061 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 1032. For example, the control signals may adjust audio output characteristics such as volume, equalization, audio image (e.g., for a paired device), audio distribution among a plurality of speakers, parameters of a low pass filter (e.g., as described with respect to FIG. 5), parameters of a peak filter (e.g., as described with respect to FIG. 7), parameters of a playback rate/pitch adjustment module (e.g., as described with respect to FIG. 9), parameters of a gain adjustment module (e.g., as described with respect to FIGS. 5, 7, and 9), etc.

In-vehicle computing system 1000 may further include an antenna(s) 1006, which may be communicatively coupled to external device interface 1012 and/or extra-vehicle-communication module 1024. The in-vehicle computing system may receive positioning signals such as GPS signals and/or wireless commands via antenna(s) 1006 or via infrared or other mechanisms through appropriate receiving devices.

One or more elements of the in-vehicle computing system 1000 may be controlled by a user via user interface 1018. User interface 1018 may include a graphical user interface presented on a touch screen and/or user-actuated buttons, switches, knobs, dials, sliders, etc. For example, user-actuated elements may include steering wheel controls, door and/or window controls, instrument panel controls, audio system settings, climate control system settings, route/route segment quality preference, route/route segment avoidance preference, and the like. A user may also interact with one or more applications of the in-vehicle computing system 1000 and mobile device 1042 via user interface 1018.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the SVSG system 102 and/or audio system 104 of FIG. 1, the sound generation system 202 of FIG. 2, and/or the in-vehicle computing system 1000 of FIG. 10. The methods may be performed by executing stored instructions with one or more logic devices (e.g., processors) in combination with one or more additional hardware elements, such as storage devices, memory, hardware network interfaces/antennas, switches, actuators, clock circuits, sensors, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A sound generation system in a vehicle, the sound generation system comprising:
 a speaker;
 a processor; and
 a storage device holding instructions executable by the processor to:
  modulate a sound characteristic of a first frequency range of a synthetic sound to generate a modulated synthetic sound portion while maintaining the sound characteristic of a second frequency range of the synthetic sound that is lower than the first frequency range to generate an unmodulated synthetic sound portion; and
  output, via the speaker, a combined synthetic sound including both the modulated synthetic sound portion at the first frequency range and the unmodulated synthetic sound portion at the second frequency range.

2. The sound generation system of claim 1, wherein the instructions are further executable by the processor to receive sensed data from a first vehicle sensor, and determine a first vehicle operating parameter using the sensed data, wherein the sound characteristic of the first frequency range of the synthetic sound is modulated as a function of the first vehicle operating parameter.

3. The sound generation system of claim 2, wherein the instructions are further executable by the processor to receive input from a second vehicle sensor indicating a second vehicle operating parameter, and adjust a gain of the combined synthetic sound as a function of the second vehicle operating parameter.

4. The sound generation system of claim 3, wherein the first vehicle operating parameter is a vehicle speed, and wherein the second vehicle operating parameter is an acceleration request for the vehicle.

5. The sound generation system of claim 1, wherein the sound characteristic is a corner frequency of a low pass filter.

6. The sound generation system of claim 2, wherein the sound characteristic is a center frequency of a peak filter.

7. The sound generation system of claim 6, wherein the first vehicle operating parameter is a vehicle speed, and wherein the center frequency of the peak filter is shifted to increasing frequencies as the vehicle speed increases.

8. The sound generation system of claim 2, wherein the modulated synthetic sound portion includes one or more first synthetic sound signals each modulated based on the first vehicle operating parameter, and wherein the unmodulated synthetic sound portion includes a selected sound signal of the one or more first synthetic sound signals that remains unmodulated independent of the first vehicle operating parameter.

9. The sound generation system of claim 8, wherein the sound characteristic is a playback rate or pitch of the one or more first synthetic sound signals.

10. The sound generation system of claim 8, wherein a respective gain of each of the one or more modulated first synthetic sound signals and the selected sound signal is adjusted based on a second vehicle operating parameter.

11. The sound generation system of claim 10, wherein the first vehicle operating parameter is a vehicle speed, and wherein the second vehicle operating parameter is an accelerator pedal position.

12. The sound generation system of claim 8, wherein the one or more modulated first synthetic sound signals and the selected sound signal are mixed to generate a first combined signal, and wherein the first combined signal is filtered with a low pass filter having a corner frequency that is adjusted based on the first vehicle operating parameter to generate the combined synthetic sound.

13. The sound generation system of claim 8, wherein the one or more modulated first synthetic sound signals and the selected sound signal are mixed to generate a first combined signal, and wherein the first combined signal is filtered with a peak filter having a center frequency that is adjusted based on the first vehicle operating parameter.

14. The sound generation system of claim 8, wherein the one or more modulated first synthetic sound signals includes two or more different synthetic sound signals.

15. A method of generating synthetic sound in a vehicle, the method comprising:
 generating a synthetic sound signal representing a synthetic sound for masking vehicle noises;
 receiving sensed data from a first vehicle sensor;
 determining a first vehicle operating parameter using the sensed data from the first vehicle sensor;
 modulating a corner frequency of a low-pass filter as a function of the first vehicle operating parameter;
 filtering the synthetic sound signal with the low-pass filter to generate a combined synthetic sound signal representing a combined synthetic sound having a modulated synthetic sound portion in a first frequency range while maintaining an unmodulated synthetic sound portion in a second frequency range that is lower than the first frequency range; and
 outputting the combined synthetic sound including both the modulated synthetic sound portion at the first frequency range and the unmodulated synthetic sound portion at the second frequency range.

16. The method of claim 15, further comprising receiving input from a second vehicle sensor, determining a second vehicle operating parameter based on the input from the second vehicle sensor, and adjusting a gain of the combined synthetic sound as a function of the second vehicle operating parameter.

17. The method of claim 16, wherein the second vehicle operating parameter is a requested acceleration, and wherein the gain is increased with increasing acceleration requests.

18. The method of claim 15, wherein the first vehicle operating parameter is a vehicle speed, and wherein the corner frequency is increased according to a logarithmic frequency scale as vehicle speed is increased according to a linear vehicle speed scale.

19. A sound generation system in a vehicle, the sound generation system comprising:
   a speaker;
   a processor; and
   a storage device holding instructions executable by the processor to:
      generate a synthetic sound signal representing a synthetic sound for masking vehicle noises;
      receive sensed data from a first vehicle sensor;
      determine a first vehicle operating parameter using the sensed data from the first vehicle sensor;
      modulate a center frequency of a peak filter as a function of the first vehicle operating parameter;
      filtering the synthetic sound signal with the peak filter to generate a combined synthetic sound signal representing a combined synthetic sound having a modulated synthetic sound portion in a first frequency range while maintaining an unmodulated synthetic sound portion in a second frequency range that is lower than the first frequency range; and
      output, via the speaker, the combined synthetic sound including both the modulated synthetic sound portion at the first frequency range and the unmodulated synthetic sound portion at the second frequency range.

20. The sound generation system of claim 19, wherein the instructions are further executable by the processor to receive input from a second vehicle sensor indicating a second vehicle operating parameter, and to adjust a gain of the synthetic sound as a function of the second vehicle operating parameter.

* * * * *